(12) United States Patent
Bramlage et al.

(10) Patent No.: US 8,793,183 B2
(45) Date of Patent: Jul. 29, 2014

(54) REVERSE CUSTOMIZED CONSUMER LOAN SEARCH

(75) Inventors: William Bramlage, West Chester, OH (US); Jonathan Strike, San Francisco, CA (US)

(73) Assignee: LoanInsights, LLC, San Francisco, CA (US)

( * ) Notice: Subject to any disclaimer, the term of this patent is extended or adjusted under 35 U.S.C. 154(b) by 496 days.

(21) Appl. No.: 12/173,226

(22) Filed: Jul. 15, 2008

(65) Prior Publication Data

US 2010/0017300 A1    Jan. 21, 2010

(51) Int. Cl.
*G06Q 40/02* (2012.01)
(52) U.S. Cl.
CPC ........................ *G06Q 40/02* (2013.01)
USPC .......................................................... 705/38
(58) Field of Classification Search
CPC ........................................................ G06Q 40/02
See application file for complete search history.

(56) References Cited

U.S. PATENT DOCUMENTS

| | | | | |
|---|---|---|---|---|
| 5,940,812 | A * | 8/1999 | Tengel et al. ................... | 705/38 |
| 7,366,694 | B2 | 4/2008 | Lazerson | |
| 7,630,932 | B2 * | 12/2009 | Danaher et al. ................ | 705/38 |
| 7,653,592 | B1 * | 1/2010 | Flaxman et al. ................ | 705/38 |
| 7,769,681 | B2 * | 8/2010 | Misraje et al. .................. | 705/38 |
| 2001/0037288 | A1 * | 11/2001 | Bennett et al. ................. | 705/38 |
| 2003/0018558 | A1 * | 1/2003 | Heffner et al. ................. | 705/37 |
| 2003/0036995 | A1 * | 2/2003 | Lazerson ....................... | 705/38 |
| 2004/0039581 | A1 * | 2/2004 | Wheeler ......................... | 705/1 |
| 2004/0199458 | A1 * | 10/2004 | Ho ................................. | 705/38 |
| 2006/0190394 | A1 * | 8/2006 | Fraser et al. ................... | 705/38 |
| 2007/0239597 | A1 * | 10/2007 | Nguyen-khoa et al. ........ | 705/38 |
| 2009/0048938 | A1 * | 2/2009 | Dupray .......................... | 705/26 |

OTHER PUBLICATIONS

U.S. Appl. No. 11/390,805, filed Mar. 27, 2006, Bramlage et al.
Ferris, F. "Load & Lock: Amerisave delivers the subprime borrower into the Web." Mortgage Technology (Jan. 2005).
"Case Study: The Money Store." New York Loan Exchange [online], Sep. 2008 [retrieved on Oct. 14, 2009]. Retrieved from the Internet: <http://www.nylx.com/mainsitepdf/NYLX-TheMoneyStore-CaseStudy.pdf>.
MortgageMarvel, Website screen printouts from www.mortgagemarvel.com, Dec. 2000, pp. 1-30.
mortgagebot.com, Website screen printouts from www.mortgagemarvel.com, Aug. 1999, pp. 1-14.
mortgagebot.com, "Mortgagebot Introduces First Online Mortgage Shopping Tool to Compare Real-Time Rates and Fees of Top Lenders", Jan. 2000.
National Mortgage News, "Mortgagebot.com Introduces First Real-Time Rate and Fee Comparison", Jan. 2000.
National Mortgage News, "Mortgagebot.com Gets Award", Mar. 2000.

(Continued)

*Primary Examiner* — Bruce I Ebersman
(74) *Attorney, Agent, or Firm* — Fernandez & Associates, LLP

(57) ABSTRACT

Embodiments of the present invention relate to methods and systems for implementing a product or property search for a consumer, based upon a consumer's desired down payment or/and desired monthly payment. Embodiments disclosed comprise a first subsystem adapted to receive a consumer profile input from a user interface wherein the said subsystem is capable of qualifying the input consumer profile against a single or plurality of lenders' guidelines, and a second subsystem adapted to match lenders' with whom the consumer qualifies, with product sets or properties, and to present the consumer with a set of available products or properties to select.

19 Claims, 21 Drawing Sheets

(56) References Cited

OTHER PUBLICATIONS mortgagebot.com, "Totally on-line mortgage service launched by M&I Mortgage Corp.", Oct. 1998.

mortgagebot.com, "New Internet mortgage lender beats E-loan and Quicken Mortgage to market with industry's first instant on-line approval", Mar. 1999.

Kersnar, Scott, "Inside an Online Search Agent", Mortgage Technology, vol. 6, No. 5, Sep./Oct. 1999.

"Mortgagebot.com Wins Innovator Award", Feb. 2000.

Kersnar, Scott, "Mortgagebot.com Tops Gomez Online Lending Scorecard", National Mortgage News, vol. 24, No. 24, Feb. 2000.

Kersnar, Scott, "Mortgagebot.com to Provide Mortgage Services for a New Online Bank", National Mortgage News, vol. 24, Nos. 27/29, Mar./Apr. 2000.

mortgagebot.com, "Mortgagebot.com Creates Partnership to Provide Online Mortgage Lending Services for Citizens Bank", Mar. 2000.

mortgagebot.com, "Everyone wants to have the best online mortgage technology", 2000.

"E-CRM: Putting Customers Under a More Powerful Microscope", Financial Service Online, May 2000.

mortgagebot.com, "Mortgagebot.com Unveils Upgrade to Its Award-Winning Mortgage Lending Web Site", Jun. 2000.

mortgagebot.com, "Mortgagebot to Use Freddie Mac's Loan Prospector on the Internet Automated Underwriting System in Its Online Lending Platform", Oct. 2000.

\* cited by examiner

Reverse Search Computing Apparatus

Matching Server

Customer Device

Property Server

Property Broker Server

Reverse Search Computing Apparatus

Required Fields

Desired Monthly Payment
Available Down Payment (or available funds at closing)

Optional Sub Fields
☐ Do you want to include estimated mortgage insurance, property taxes and insurance in monthly payment?
Range of Monthly Payments or "+" or "-" an acceptable amount ☐ Do you want to include Closing Costs as part of the available funds at closing?
Funds Available for Closing Costs
Points Willing to Pay upfront to reduce rate   (% of loan amount)

TOTALS

Total Desired Monthly Housing Payment
Total Funds Required to Close

Sample Optional Fields for Borrower Qualification (alternative embodiments) *
Annual Income
Monthly debt payments
Credit Score Property Type
Occupancy Type
State

FIG. 7A

Results Display

| Max Purchase Price | Max Total Loan Amount | Monthly Payment | Down Payment | Lender | Product Term | Interest Rate |
|---|---|---|---|---|---|---|
| $500,000 | $480,000 | $1,600 | $20,000 | Lender A | 3 Year Interest Only ARM | 4.00% |
| $345,244 | $325,244 | $1,600 | $20,000 | Lender R | 5 Year Fully Amortizing ARM | 4.25% |
| $318,050 | $298,050 | $1,600 | $20,000 | Lender M | 30 Year Fully Amortizing Fixed | 5.00% |

*Sample Optional Fields in Results Displays*

| Closing Costs | "Points" | Estimated Monthly Taxes and Insurance | | Total Funds at Closing | Total Est. Monthly Housing Cost |
|---|---|---|---|---|---|
| $10,000 | 0.50% - $2,400.00 | $416.67 | | $30,000 | $2,016.67 |
| $10,000 | 0.75% - $2,439.33 | $287.70 | | $30,000 | $1,887.70 |
| $10,000 | 0.00% - $0.00 | $265.04 | | $30,000 | $1,865.04 |

FIG. 7B

User Interface

Required Fields
Desired Monthly Payment

Optional Sub Fields
☐ Do you want to include estimated property taxes and insurance in monthly payment?
Range of Monthly Payments or "+" or "-" an acceptable amount Estimated Purchase Price

TOTALs
Total Desired Monthly Housing Payment

Optional Fields for Borrower Qualification (alternative embodiments) *
Annual Income
Monthly debt payments
Credit Score Property Type
Occupancy Type
State

FIG. 8A

Results Display

| Purchase Price | Max Total Loan Amount | Monthly Payment | Required Down Payment | Lender | Product Term | Interest Rate |
|---|---|---|---|---|---|---|
| $700,000 | $480,000 | $1,600 | $220,000 | Lender A | 3 Year Interest Only ARM | 4.00% |
| $700,000 | $325,244 | $1,600 | $374,556 | Lender R | 5 Year Fully Amortizing ARM | 4.25% |
| $700,000 | $298,050 | $1,600 | $401,950 | Lender M | 30 Year Fully Amortizing Fixed | 5.00% |

*Optional Fields in Results Displays*

| Closing Costs | "Points" | Estimated Monthly Taxes and Insurance | | Total Funds at Closing | Total Est. Monthly Housing Cost |
|---|---|---|---|---|---|
| $10,000 | 0.50% - $2,400.00 | $416.67 | | $30,000 | $2,016.67 |
| $10,000 | 0.75% - $2,439.33 | $287.70 | | $30,000 | $1,887.70 |
| $10,000 | 0.00% - $0.00 | $265.04 | | $30,000 | $1,865.04 |

FIG. 8B

Required Fields

Available Down Payment (or available funds at closing)

Optional Sub Fields

☐ Do you want to Closing Costs as part of the available funds at closing?
Funds Available for Closing Costs
Points Willing to Pay upfront to reduce rate    (% of loan amount)

TOTALs

Total Funds Required to Close

Optional Fields for Borrower Qualification (alternative embodiments) *
Annual Income
Monthly debt payments
Credit Score Property Type
Occupancy Type
State

FIG. 9A

Results Display

| Max Purchase Price | Max Total Loan Amount | Monthly Payment | Down Payment | Lender | Product Term | Interest Rate |
|---|---|---|---|---|---|---|
| $500,000 | $480,000 | $1,600.00 | $20,000 | Lender A | 3 Year Interest Only ARM | 4.00% |
| $500,000 | $480,000 | $2,361.31 | $20,000 | Lender R | 5 Year Fully Amortizing ARM | 4.25% |
| $500,000 | $480,000 | $2,576.74 | $20,000 | Lender M | 30 Year Fully Amortizing Fixed | 5.00% |

*Optional Fields in Results Displays*

| Closing Costs | "Points" | Estimated Monthly Taxes and Insurance | | Total Funds at Closing | Total Est. Monthly Housing Cost |
|---|---|---|---|---|---|
| $10,000 | 0.50% - $2,400.00 | $416.67 | | $30,000 | $2,016.67 |
| $10,000 | 0.75% - $2,439.33 | $287.70 | | $30,000 | $1,887.70 |
| $10,000 | 0.00% - $0.00 | $265.04 | | $30,000 | $1,865.04 |

FIG. 9B

User Interface

Required Fields

Desired Monthly Payment
Current Loan Balance
Estimated Property Value

Optional Sub Fields
Insurance/HOA monthly payments
Annual or Monthly Property Taxes Funds Available for Closing Costs
Points willing to Pay upfront to reduce rate     (% of loan amount)

TOTALS

Total Desired Monthly Housing Payment
Total Funds Required to Close

Optional Fields for Borrower Qualification (alternative embodiments) *
Annual Income
Monthly debt payments
Credit Score Property Type
Occupancy Type
State

FIG. 10A

Results Display

| Monthly Payment | Interest Rate | Lender | Product Term | Closing Costs | "Points" |
|---|---|---|---|---|---|
| $1,600 | 4.00% | Lender A | 3 Year Interest Only ARM | $10,000 | 0.50% - $2,400.00 |
| $2,000 | 4.25% | Lender R | 5 Year Fully Amortizing ARM | $10,000 | 0.75% - $2,439.33 |
| $2,500 | 5.00% | Lender M | 30 Year Fully Amortizing Fixed | $10,000 | 0.00% - $0.00 |

FIG. 10B

Interface

Required Fields

Desired Monthly Payment
Desired Cash-Out Amount
Current Loan Balance
Estimated Property Value Optional Sub Fields
Insurance/HOA monthly payments
Annual or Monthly Property Taxes ☐ Do you want to consider the closing costs and any buydown "points" separately from the cash-out amount?
Funds Available for Closing Costs
Points willing to Pay upfront to reduce rate    (% of loan amount)

TOTALs

Total Desired Monthly Housing Payment
Total Funds Required to Close

Optional Fields for Borrower Qualification (alternative embodiments) *
Annual Income
Monthly debt payments
Credit Score Property Type
Occupancy Type
State

FIG. 11A

Results Display

| Monthly Payment | Interest Rate | Lender | Product Term | Cash-Out Amount |
|---|---|---|---|---|
| $1,600 | 4.00% | Lender A | 3 Year Interest Only ARM | $10,000 |
| $2,000 | 4.25% | Lender R | 5 Year Fully Amortizing ARM | $10,000 |
| $2,500 | 5.00% | Lender M | 30 Year Fully Amortizing Fixed | $10,000 |

*Optional Fields in Results Displays*

| Closing Costs | "Points" | Total Funds as Cashed Out |
|---|---|---|
| $10,000 | 0.50% - $2,400.00 | $30,000 |
| $10,000 | 0.75% - $2,439.33 | $30,000 |
| $10,000 | 0.00% - $0.00 | $30,000 |

FIG. 11B

REVERSE CUSTOMIZED CONSUMER LOAN SEARCH

FIELD OF THE INVENTION

The present invention is directed to systems and methods of searching for products or property sets based on matching a consumer's financial capacity, credit, and eligibility vis-à-vis a lender or lenders, with available product or property sets.

BACKGROUND OF THE INVENTION

The current mortgage market is flooded with lender's competing to offer a variety of mortgage products. Several lenders offer attractive loans or combination of loans to finance a consumer's desired purchase of products or properties. Computerized systems and methods have also been created to provide potential borrower's customized mortgage loans that meet their changing needs and different financial goals.

Existing systems and methods however, rely on a consumer's desired loan amount, based on which, along with other criteria, a loan is customized. There is no system or method that reverses the search process, wherein a consumer simply need provide information regarding monthly payment and down payment information on either a desired product or property set, and a result is obtained. There is also no system or method that matches a consumer profile with lenders and product or property sets available.

Often a consumer does not know what his or her capacity is to service a particular loan. A consumer could only be aware of their capacity to make monthly payments for a particular loan. For example, a consumer may know that they are capable of paying say $2,000 a month for the purchase of a particular product or property. There thus remains a need for a method and system to estimate a consumer's buying capacity, and based on which estimate there remains a further need to provide the consumer with product or property sets available based on the consumer's capacity. There also remains a need for a method and system that matches lenders' pricing guidelines and available product or property sets with minimal entered consumer criteria. Embodiments of the present invention attempt to address the aforementioned need.

SUMMARY OF THE INVENTION

A preferred embodiment includes a computer automated method for creating, organizing, and updating a centralized and searchable database of a plurality of a set of available products or properties based upon lending institutions' underwriting and pricing guidelines for loans to eligible consumers for the said products or properties. The method comprises the steps of receiving a first lender subset database and receiving a second lender subset database, modifying one or more subset databases with a minimum compliance level of data, storing all subset database information in a loan broker lender database such that matching and optimization of loans with products or properties for a consumer may be performed, receiving a consumer profile and qualifying a consumer for a lender's loan, and searching for, matching, and presenting a product or property set that conforms to the qualified consumer's entered criteria.

Another embodiment includes a method of interfacing a customer computer or device to an additional computer or device through a network interface for searching a first database of a plurality of available product or property sets and a second database of lending institutions' underwriting and pricing guidelines for a consumer, the method comprising the steps of receiving and storing consumer information within the additional computer or device, performing one or more calculations using the consumer information to obtain credit related values, creating a consumer profile comprising consumer information and the results of credit related value calculations, and based on the created consumer profile matched with lending institutions, identifying and presenting a consumer a product or property set or a plurality of purchasable product or property sets.

Yet another embodiment includes a method for implementing a product or property search for a consumer, based upon a consumer's desired down payment or desired monthly payment, comprising receiving by a first subsystem a consumer profile input from a user interface and qualifying the input consumer profile against a single or plurality of lenders' guidelines, and matching by a second subsystem, lenders with whom the consumer qualifies, with product sets or properties, and presenting the consumer with a set of available products or properties to select.

An embodiment includes a system to implement a product or property search for a consumer, based upon a consumer's desired down payment or desired monthly payment comprising a first subsystem adapted to receive a consumer profile input from a user interface wherein the said subsystem is capable of qualifying the input consumer profile against a single or plurality of lenders' guidelines, and a second subsystem adapted to match lenders with whom the consumer qualifies with product sets or properties, and to present the consumer with a set of available products or properties to select.

BRIEF DESCRIPTION OF DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

FIG. 7A illustrates a layout of a user interface in an embodiment for purchase transactions that include monthly payments and desired down payment as mandatory input.

FIG. 7B illustrates a layout of results returned in response to inputs through the interface of FIG. 7A.

FIG. 8A illustrates a layout of a user interface in an embodiment for purchase transactions that include only monthly payments as mandatory input.

FIG. 8B illustrates a layout of results returned in response to inputs through the interface of FIG. 8A.

FIG. 9A illustrates a layout of a user interface in an embodiment for purchase transactions that include only desired down payment as mandatory input.

FIG. 9B illustrates a layout of results returned in response to inputs through the interface of FIG. 9A.

FIG. 10A illustrates a layout of a user interface in an embodiment for refinance transactions.

FIG. 10B illustrates a layout of results returned in response to inputs through the interface of FIG. 10A.

FIG. 11A illustrates a layout of a user interface in an embodiment for cash-out transactions.

FIG. 11B illustrates a layout of results returned in response to inputs through the interface of FIG. 11A.

DETAILED DESCRIPTION OF EMBODIMENTS

Figure 1:
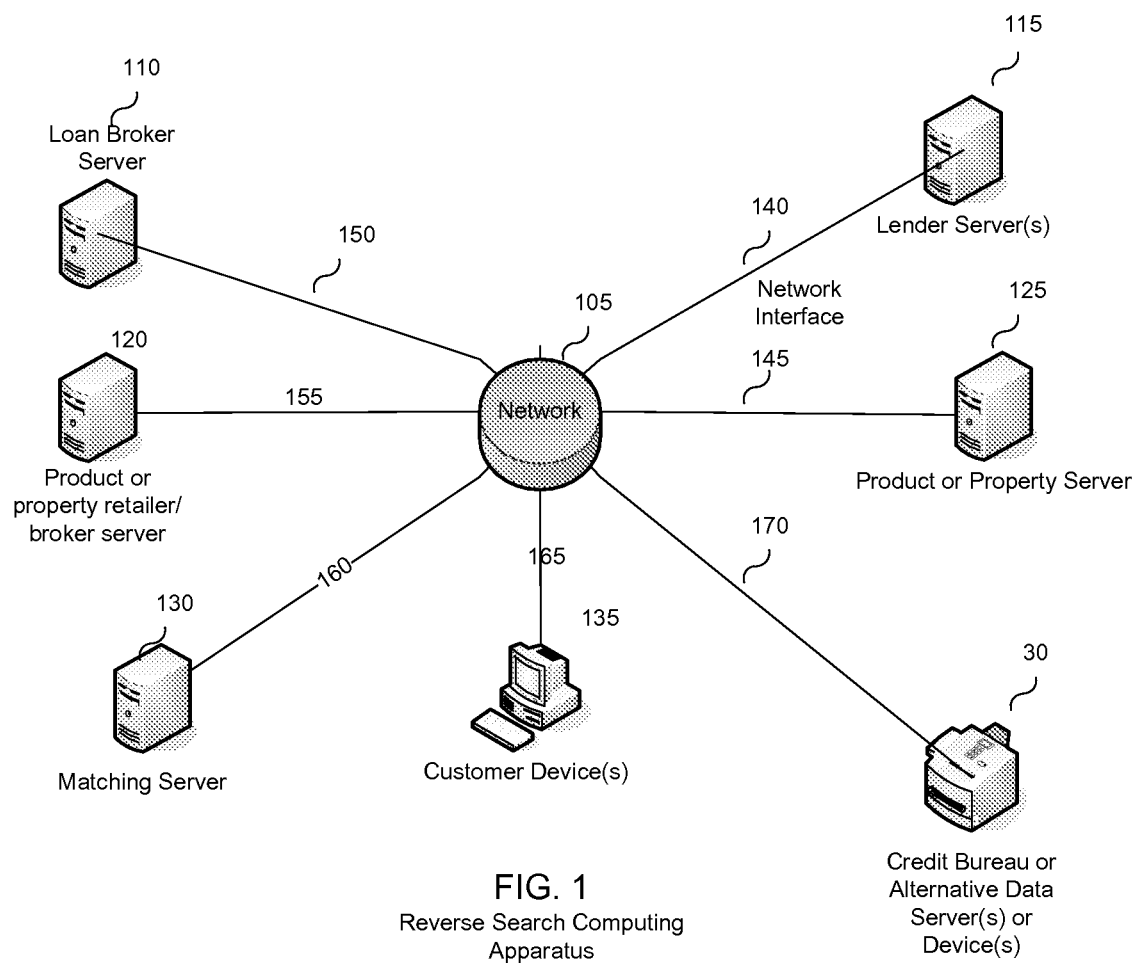
FIG. 1 shows a block diagram of a computing apparatus implementing an embodiment of the present invention.

The following terms have these corresponding definitions in the description:

AVAILABLE LOAN PRODUCT: A loan that a lender generally offers and will offer to a potential consumer when the given attributes of that consumer satisfy the loan acceptance criteria.

BEST AVAILABLE LOAN PRODUCT: An available loan product or combination of loan products selected by the programming logic and presented to the potential consumer as possessing the best (i.e., most favorable or desirable to the consumer based upon their custom consumer profile) attribute or combination of attributes relative to all other available loan products.

CONSUMER PROFILE: Information about a consumer based on (1) input provided by the consumer or from alternative sources about the consumer and the loan type(s) they are seeking such as income and asset information, use of proceeds including, for example, value and additional information about a property they may be buying or refinancing, amount of loan, and credit information and (2) calculations and programming performed by the loan broker server.

LENDER: A bank, finance company, mortgage bank, wholesale lender, or other entity in the business of providing loans.

LOAN ACCEPTANCE CRITERIA: Attributes the lender requires to be possessed by a potential consumer in order to make a loan available to that consumer.

MINIMUM COMPLIANCE LEVEL OF DATA: The baseline criteria required for determining loan eligibility and pricing that is uniformly collected from each individual lender and is then modified as necessary, organized, and stored in conjunction with like criteria from all other lending institutions. The aggregation of such criteria from each of the plurality of lending institution's underwriting and pricing guidelines forms the loan broker server's searchable and centralized lender database for use in matching and optimizing loan products and associated rate pricing for a consumer. This baseline criteria comprises: credit score, loan amount, cash-out amount, loan-to-value ratio (LTV), combined loan-to-value ratio (CLTV), front DTI, back DTI, PITI reserve requirements, tradelines, payment history, bankruptcy history, foreclosure history/information, notice of default history/information, interest only versus fully amortizing, product terms, use of proceeds, lien position, property type, occupancy type, property location, documentation type, and employment type.

A preferred embodiment includes a computer automated method for creating, organizing, and updating a centralized and searchable database of a plurality of a set of available products or properties based upon lending institutions' underwriting and pricing guidelines for loans to eligible consumers for the said products or properties. The method comprises the steps of receiving a first lender subset database and receiving a second lender subset database, modifying one or more subset databases with a minimum compliance level of data, storing all subset database information in a loan broker lender database such that matching and optimization of loans with products or properties for a consumer may be performed, receiving a consumer profile and qualifying a consumer for a lender's loan, and searching for, matching, and presenting a product or property set that conforms to the qualified consumer's entered criteria.

FIG. 1 shows a block diagram of a computing apparatus implementing an embodiment of the present invention. The block diagram 100 shows network system 105 having one or more loan broker servers 110, one or more lender servers 115, one or more product or property retailer/broker servers 120, one or more product or property servers 125, one or more matching servers 130, and one or more client processors or nodes 135, coupled thereto. Those of ordinary skill in the art will appreciate that the network interface 140, 145, 150, 155, 160 and 165 includes the necessary circuitry for connecting the loan broker servers, product or property broker/retail servers, client processors, or nodes to the network 105, and that the network interface 140, 145, 150, 155, 160 and 165 is also preferably constructed for use according to the standard Transmission Control Protocol/Internet Protocol ("TCP/IP") protocol, the Internet Inter-ORB Protocol ("IIOP"), or other conventional digital networking and data communications scheme.

In a preferred embodiment, a consumer enters his or her profile using customer device 135. The entered profile includes a consumer's desired monthly payment and desired down payment. Essentially, here a consumer does not need to know the value of a product or property that he or she can afford. They are inputting information on their capability to make a down payment and a monthly payment on a property. Based on this input information, the loan broker server 110 searches from a lender server 115, for lenders that would meet the consumer's criteria. Further, based on a consumer's desired down payment and desired monthly payment, a total loan amount is calculated by the loan broker server. This calculation is communicated to the product or property retailer server 130, which then searches for properties from the property server 135 in the range of the value calculated. The matching server 130 matches available properties in the product or property retailer server 120 with eligible lenders in the loan broker server 110, and presents the consumer with a list of available properties and lender's willing to finance the available properties. In alternate embodiments, the matching server can communicate directly with the lender database and the product or property database, qualify a lender, match the lender with an available product/property set, and present the consumer with a list of available properties and associated willing lenders.

Figure 2:
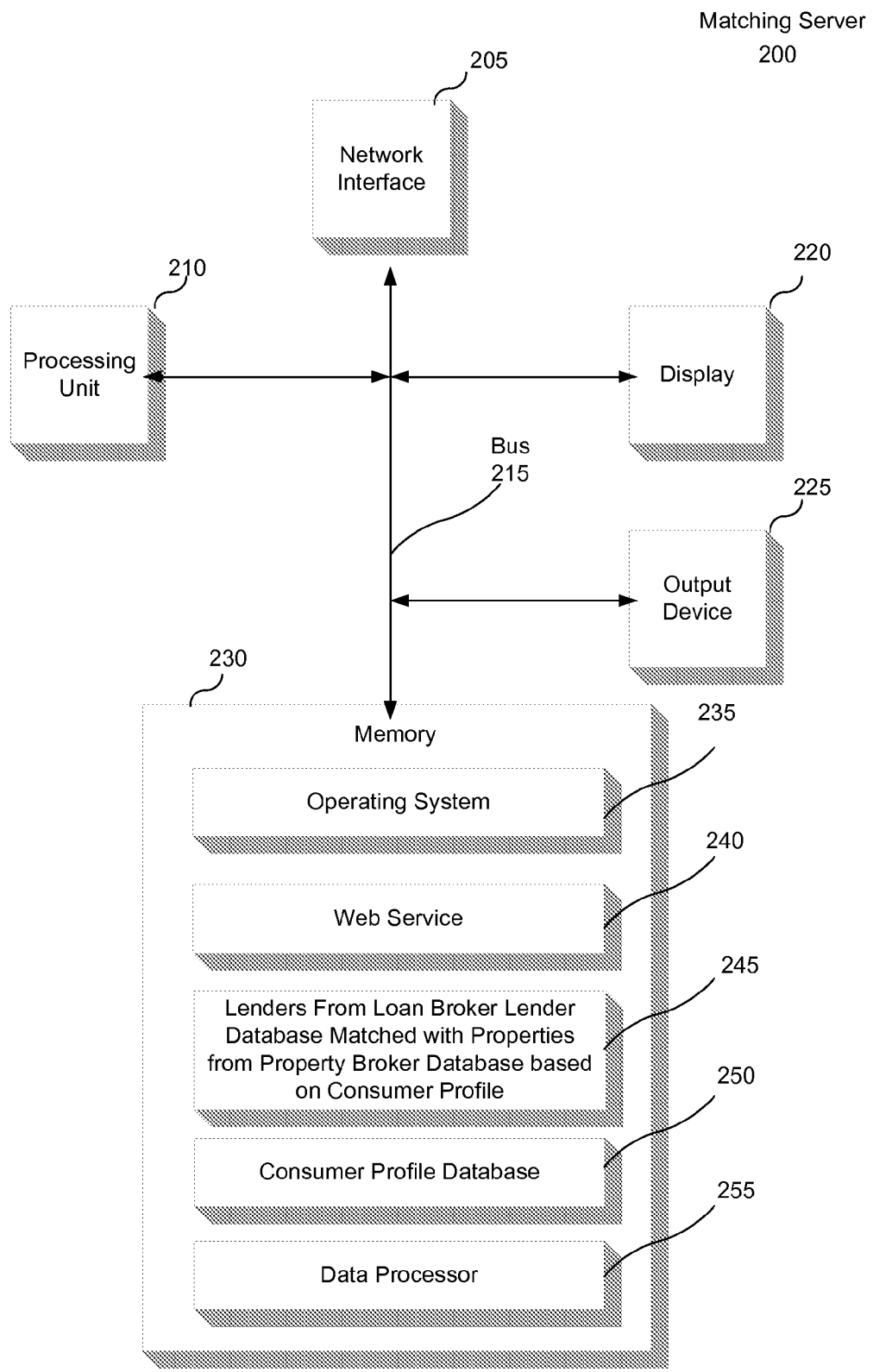
FIG. 2 shows a block diagram illustrating the matching server of FIG. 1.

FIG. 2 depicts several of the key components of the matching server 200. Those of ordinary skill in the art will appreciate that the matching server 200 includes many more components than those shown in FIG. 2. However, it is not necessary that all of these generally conventional components be shown in order to disclose an enabling embodiment for practicing the present invention. As shown in FIG. 2, the matching server 200 is connected to the network via a network interface 205. Those of ordinary skill in the art will appreciate that the network interface 205 includes the necessary circuitry for connecting the matching server 200 to the network 105, and is also constructed for use with the TCP/IP protocol or other protocols, such as the IIOP, or other conventional digital networking and data communications scheme.

The matching server 200 also includes a processing unit 210, a display 220, an output device 225, and a mass memory 230 all interconnected along with the network interface 205 via a bus 215. The output device 225 could be any type of device capable of receiving output from the matching server 200, such as, but not limited to, a printer, a smart card reader, a plotter or a storage mechanism like a floppy, tape or DVD/CD-ROM drive. The mass memory 230 generally comprises a RAM, a ROM, and one or more permanent mass storage devices, such as a hard disk drive, tape drive, optical drive, floppy disk drive, or combination thereof. The mass memory 230 stores an operating system 235 and the program code and data necessary for receiving, processing, formatting, requesting and sending one or more loan product names, related underwriting and pricing guidelines and characteristics, and related rates, one or more product or property types, matching the products/properties with eligible lenders based on the consumer profile, as well as, supplying the results of that processing to other devices such as the customer device 135 in accordance with an embodiment of the present invention. The mass memory 230 includes a searchable database 245 of eligible lenders matched with available product or property sets, including lender and lender product names, underwriting and pricing guidelines and rates received, processed, and formatted from a plurality of lender servers 115, and matched products or property sets formatted from a plurality of product/property servers 125. Additionally, the memory 230 stores a web service 240 for providing web connectivity to the network 105 for devices and servers with web browsers, such as the customer device(s) 135 having web browser 280. The mass memory 230 also stores a data processor 255 for creation and storage of one or more of a consumer profile 250 or additional information required to initiate a transaction. The data processor 255 also contains the matching and optimization program logic which is utilized for the matching of a consumer's qualifications and needs as defined by the consumer profile 250 to the best available product or property sets, matched with available loan products.

It will be appreciated that the aforementioned software components may be loaded from a computer-readable medium into mass memory 230 of the matching server 200 using a drive mechanism (not shown) associated with the computer-readable medium, such as floppy, tape or DVD/CD-ROM drive or via the network interface 205.

Although an exemplary matching server 200 has been described that generally conforms to a conventional general purpose computing device, those of ordinary skill in the art will appreciate that a matching server 200 may be any of a great number of devices capable of communicating via the network 105.

Figure 3:
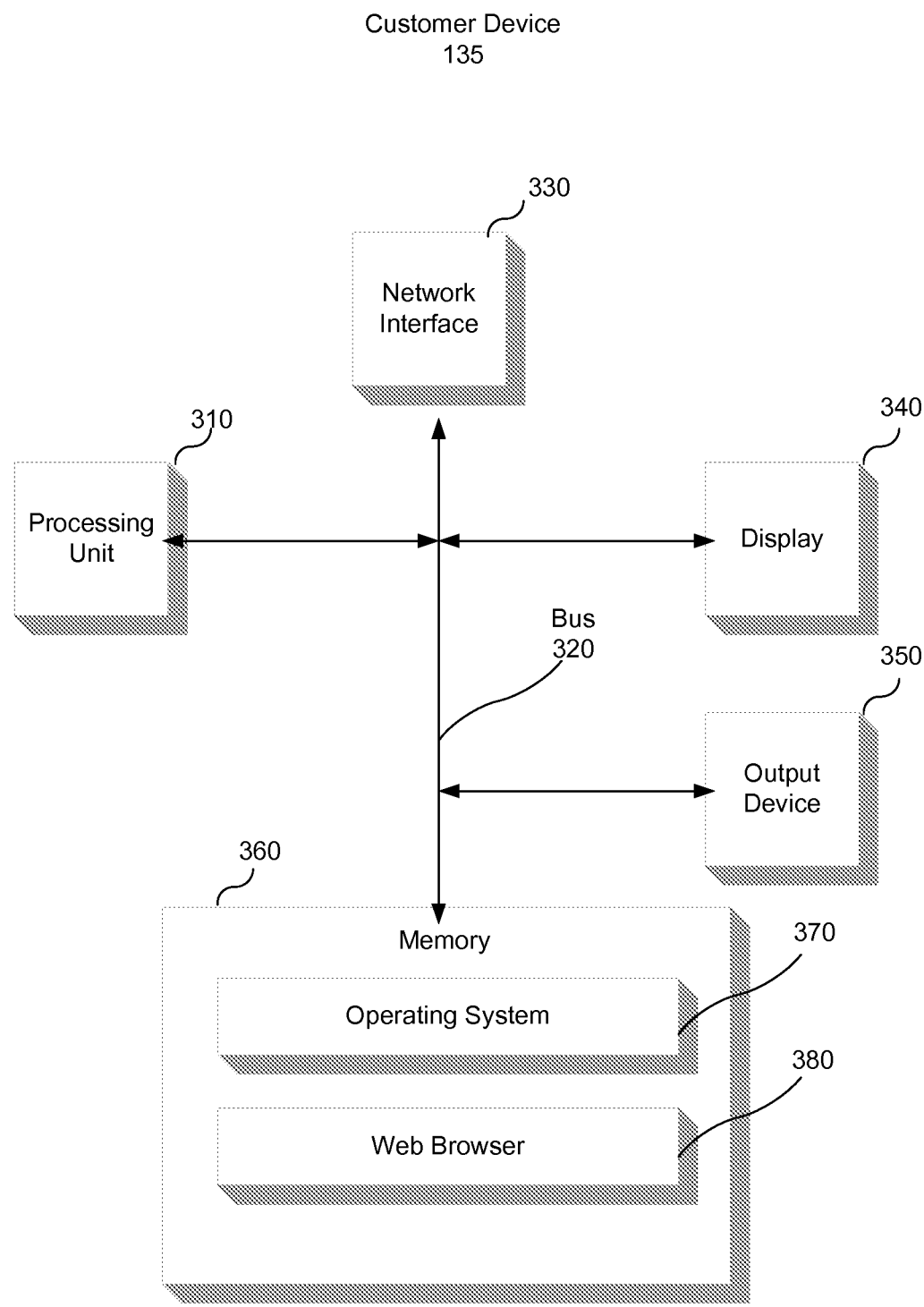
FIG. 3 shows a block diagram illustrating several components of the customer device of FIG. 1 used to obtain consumer data in accordance with an embodiment of the present invention.

FIG. 3 depicts several of the key components of the customer device 135. Those of ordinary skill in the art will appreciate that the customer device 135 includes many more components than those shown in FIG. 3. However, it is not necessary that all of these generally conventional components be shown in order to disclose an enabling embodiment for practicing the present invention. As shown in FIG. 1, the customer device 135 is connected to the network 105 via a network interface 330. Those of ordinary skill in the art will appreciate that the network interface 330 includes the necessary circuitry for connecting the customer device 135 to the network 105, and is also constructed for use with the TCP/IP protocol, other protocols such as IIOP, or other conventional digital networking and data communications scheme. Alternatively, a customer device 135 may be located with a customer service representative who would submit information required for creation of a consumer profile on the behalf of a potential customer who does not have direct access to the network 105 but is in direct contact with the customer service representative via the global telecommunications network.

The customer device 135 also includes a processing unit 310, a display 340, an output device 350, and a mass memory 360 all interconnected along with the network interface 330 via a bus 320. The output device 350 could be any type of device capable of receiving output from the customer device 135, such as, but not limited to, a printer, a smart card reader, a plotter or a storage mechanism like a floppy, tape or DVD/CD-ROM drive. The memory 360 generally comprises a RAM, a ROM, and a permanent storage device, such as a hard disk drive, tape drive, optical drive, floppy disk drive, or combination thereof. The memory 360 stores an operating system 370 and a Web browser 380. It will be appreciated that these software components may be loaded from a computer-readable medium into memory 360 of the customer device 135 using a drive mechanism (not shown) associated with the computer-readable medium, such as a floppy, tape or DVD/CD-ROM drive or via the network interface 330.

Although an exemplary customer device 135 has been described that generally conforms to a conventional general purpose computing device, those of ordinary skill in the art will appreciate that a customer device 135 may be any of a great number of devices capable of communicating with the network 105, e.g., a cell phone, a wired or wireless personal digital assistant, workstation, laptop, etc.

Figure 4:
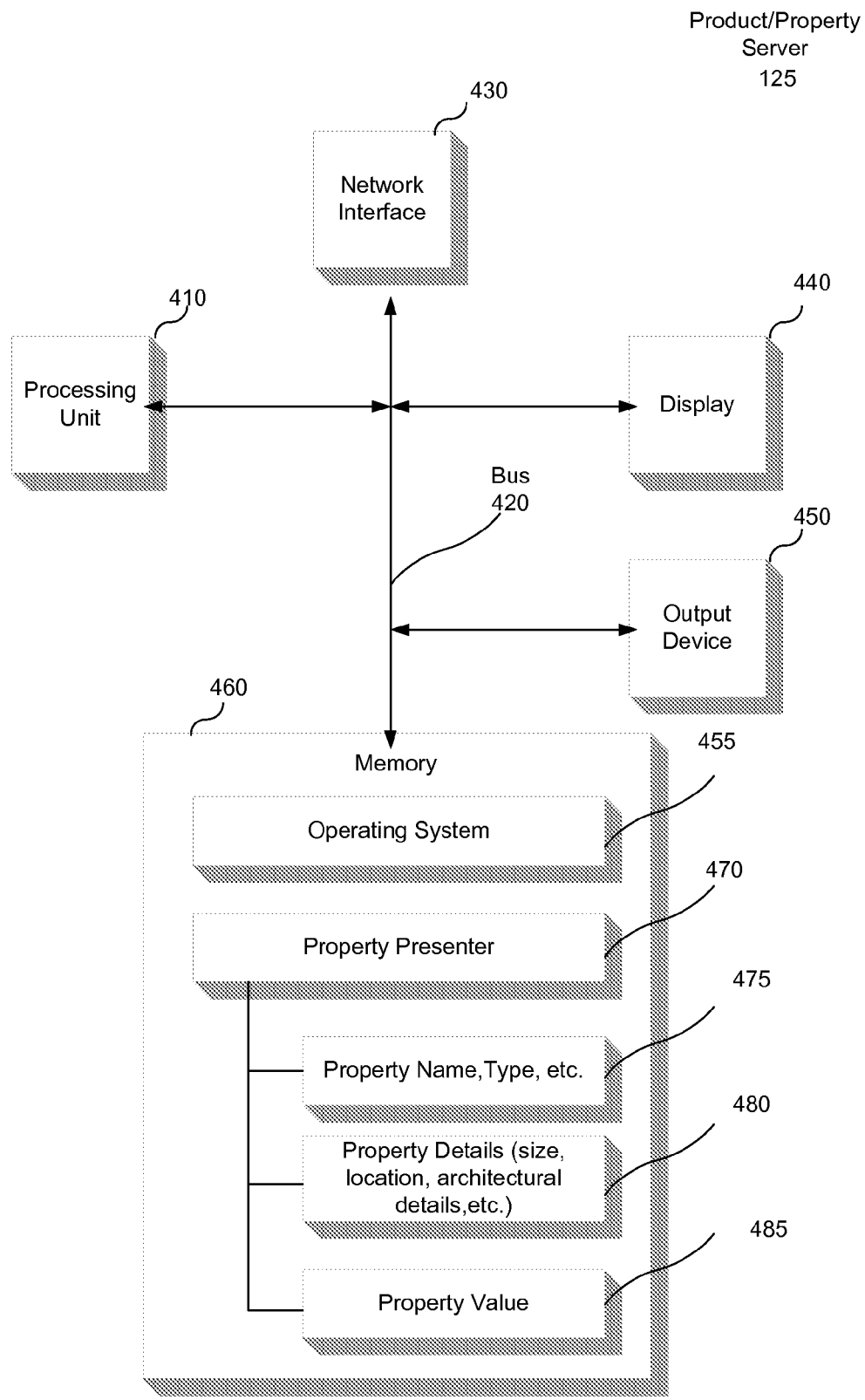
FIG. 4 shows a block diagram illustrating several components of the property server of FIG. 1.
Figure 5:
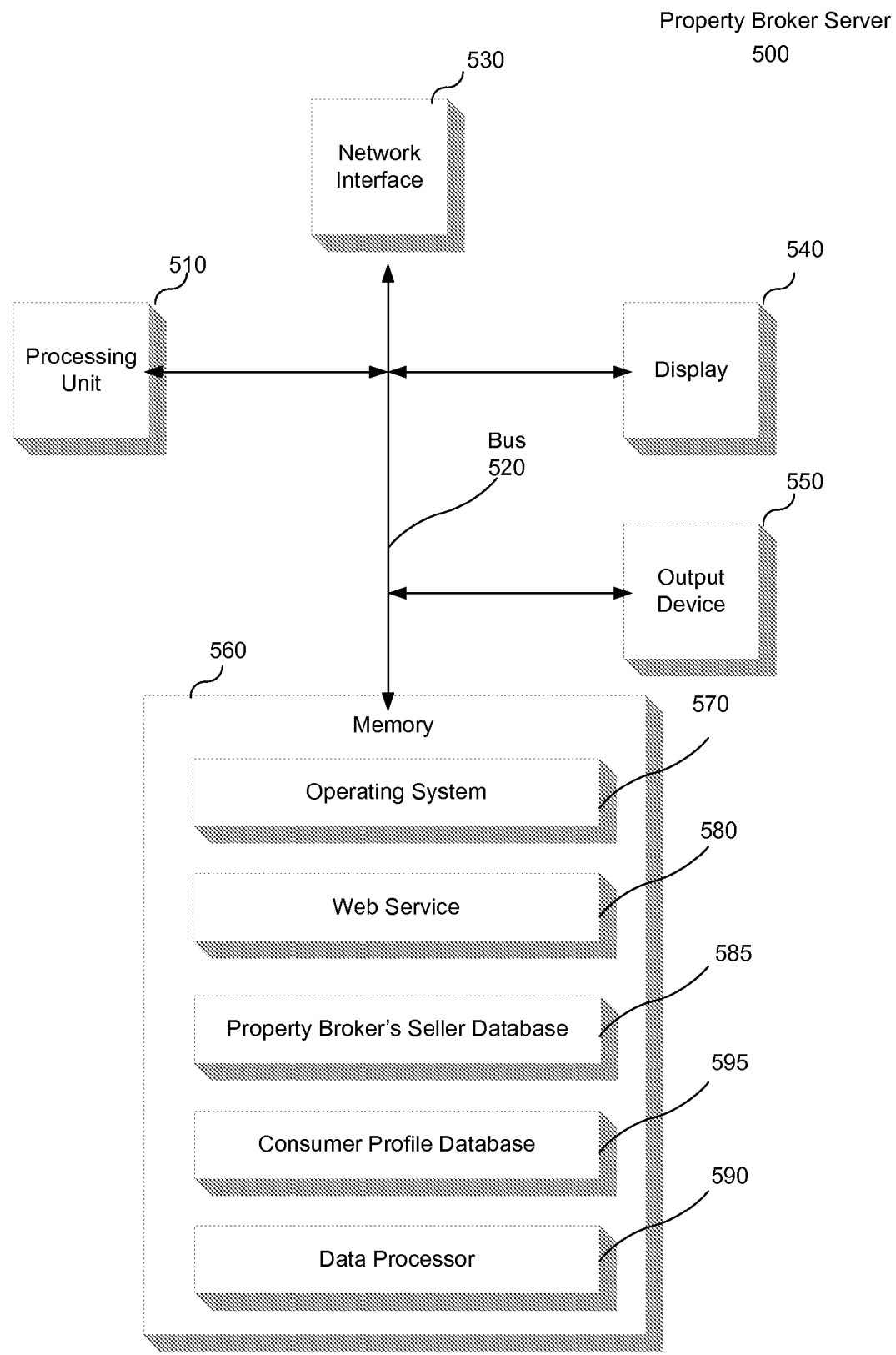
FIG. 5 shows a block diagram illustrating several components of the product or property retailer/broker database of FIG. 1.

FIG. 4 depicts several of the key components of the product or property server 125. Those of ordinary skill in the art will appreciate that the property server 125 includes many more components than those shown in FIG. 4. However, it is not necessary that all of these generally conventional components be shown in order to disclose an enabling embodiment for practicing the present invention. As shown in FIG. 1, the property server 125 is connected to the network 105 via a network interface 430. Those of ordinary skill in the art will appreciate that the network interface 430 includes the necessary circuitry for connecting the property server 125 to the network 105, and is also constructed for use with the TCP/IP protocol, other protocols such as IIOP, or other conventional digital networking and data communications scheme.

The property server 125 also includes a processing unit 410, a display 440, an output device 450, an operating system 455, and a mass memory 460 all interconnected along with the network interface 430 via a bus 420. The output device 450 could be any type of device capable of receiving output from the property server 125, for example a printer, a smart card reader, a plotter or a storage mechanism like a floppy, tape, DVD/CD-ROM drive, or portable hard drive. The mass memory 460 generally comprises a random access memory ("RAM"), a read-only memory ("ROM"), and one or more permanent mass storage devices, such as a hard disk drive, tape drive, optical drive, floppy disk drive, or combination thereof. The mass memory 460 stores the program code and data necessary for receiving, processing, formatting, requesting or sending one or more property names, related location information and property characteristics, and property value, including price, as well as supplying the results of that processing to other devices such as property broker server(s) via the network 105 as shown in FIG. 1 in accordance with an embodiment of the present invention.

Although an exemplary property server 125 has been described that generally conforms to a single conventional general purpose computing device, those of ordinary skill in the art will appreciate that a property server 125 may be a combination of computing devices or components, coordinated to communicate with one or more servers over a network 105.

Preferably, for more accurate results a consumer can input optional sub-fields through the interface of the customer device. For example the interface on the customer device could include an option to input estimated mortgage insurance, property taxes and insurance in monthly payment. The consumer could then input a range of Monthly Payments or "+" or "−" an acceptable amount. Additionally, if a consumer chooses to include closing costs as part of the available funds at closing, he or she can also enter funds available for closing costs and optionally, points they are willing to pay upfront to reduce rate, which rate could be calculated as a percentage of the loan amount. Total desired monthly housing payment, and total funds required to close can also be input. Alternative embodiments may also include optional fields for borrower qualification such as annual income, monthly debt payments, credit score, property type, occupancy type, and state. FIG. 7A illustrates a layout of a user interface in an embodiment, for purchase transactions that include monthly payments and desired down payment as mandatory input. Additional and alternative embodiment input options are also shown. FIG. 7B illustrates a layout of results returned in response to inputs through the interface of FIG. 7A. In the illustration of FIG. 7B results returned include a maximum purchase price, maximum total loan amount, monthly payment, down payment, the lender name, product term and type, and the offered interest rate. For example, on a maximum purchase price of $500,000, Lender A offers a maximum total loan amount of $480,000 in a 3 year interest only ARM at an interest rate of 4%. This would make for a total monthly payment of $1,600 with a required down payment of $20,000. More results displays and sample optional fields in results displays are also shown, and are self explanatory. Products offered also include but are not limited to a 5 year fully amortizing ARM and a 30 year fully amortizing fixed. Essentially, the figure and the fields shown are for illustrative purposes only, and not to limit the invention to the precise form described. Other modifications and several lender product offerings are possible as would be apparent to one skilled in the art.

An embodiment includes qualifying a borrower for a lender(s) products without accounting for Loan Amount, loan-to-value ratio (LTV), and combined loan-to-value ratio (CLTV). Alternate embodiments include qualifying the consumer based on at least one of a desired down payment, a desired monthly payment, a loan-to-value ratio (LTV), and a combined loan-to-value ratio (CLTV). A preferred embodiment includes determining a maximum loan amount available to a consumer based on the consumer desired down payment and desired monthly payment. Further, the embodiment can also include determining a maximum loan amount available to a consumer based on the input consumer profile and minimum compliance level of data wherein the said minimum compliance level of data comprises loan characteristics, qualifying ratios and limits, base rate pricing, yield spread rate pricing (also known as service release premium pricing, or gain on sale pricing, or rebate pricing) and pricing adjustments (also known as Loan Level Pricing Adjustments or "LLPA"), and rate add-ons. Creation of the consumer profile based on consumer information entered is described in detail in patent application Ser. No. 11/390,805, entitled "Customized Consumer Loan Search and Optimized Loan Pricing" which is incorporated by reference in its entirety.

Preferably, when a consumer/borrower inputs their profile, the method includes, getting rates from all loan product types that qualify. The rates are based on the lowest loan-to-value ratio (LTV) and combined loan-to-value ratio (CLTV) within the lender(s) base rate and yield spread pricing metrics. In a preferred embodiment, there is no need to account for the loan amount. A preferred embodiment includes a method of determining a product or property set available to a consumer based on a consumer input desired down payment, and desired monthly payment. The method can further comprise determining a product set available to a consumer based on consumer input minimum compliance level of data. The method also includes calculating the maximum loan amount available to the consumer, given the interest rate of each loan term, and for each loan term and corresponding loan amount, calculating the maximum loan-to-value ratio (LTV) and combined loan-to-value ratio (CLTV) for a consumer.

Figure 7C:
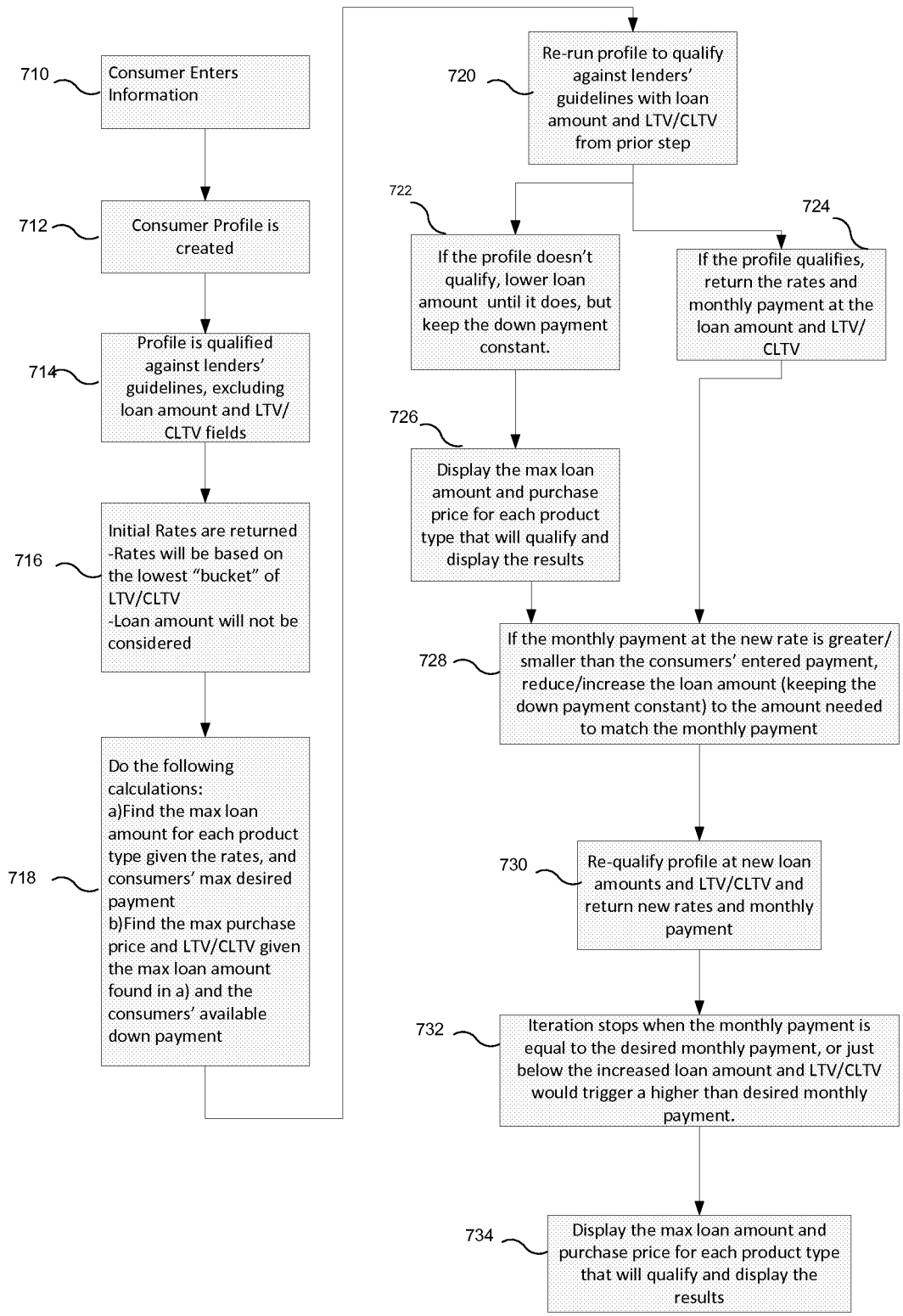
FIG. 7C is an overview of a flow diagram illustrating a step by step process by which purchase transactions are effected using both a consumer's desired monthly payment and their desired down payment.

FIG. 7C is a process flow diagram illustrating purchase transactions using both monthly payment and down payment. In step 710, a consumer enters his or her information. In step 712, the system creates the consumer profile based on consumer information entered. Step 714 of the illustrated embodiment depicts the consumer profile, wherein the said consumer profile is qualified against lenders' guidelines, excluding loan amount and loan-to-value ratio (LTV) and combined loan-to-value ratio (CLTV) fields. In step 716, the system returns initial rates wherein the rates will be based on the lowest bucket of loan-to-value ratio (LTV) and combined loan-to-value ratio (CLTV) and the loan amount will not be considered. In step 718, the system performs calculations to find the maximum loan amount for each product type given the rates, and consumers' maximum desired payment, and to find the maximum purchase price and loan-to-value ratio (LTV) and combined loan-to-value ratio (CLTV) given the calculated maximum loan amount and the consumers' available down payment. In step 720 the consumer profile is re-run to qualify against lenders' guidelines with loan amount and loan-to-value ratio (LTV) and combined loan-to-value ratio (CLTV) from step 718. If the consumer profile does not qualify from step 720, in step 722 the system lowers the loan amount until the consumer profile qualifies, but keeps the down payment constant. If however, the consumer profile does qualify in step 720, the system returns the rates and monthly payment at the loan amount and loan-to-value ratio (LTV) and combined loan-to-value ratio (CLTV) in step 724. Step 726 follows from step 722 and includes displaying the maximum loan amount and purchase price for each product type that will qualify, and displaying the results. Step 728 follows step 724 and 726 and includes reducing or increasing the loan amount (keeping the down payment constant) to the amount needed to match the monthly payment if the monthly payment at the new rate is greater or smaller than the consumer's entered payment. Step 730 includes re-qualifying the consumer profile at new loan amounts and loan-to-value ratio (LTV) and combined loan-to-value ratio (CLTV) and returning new rates and monthly payment. In step 732, the iteration stops when the monthly payment is either equal to the desired monthly payment, or close to but below the point where the increased loan amount and loan-to-value ratio (LTV) and combined loan-to-value ratio (CLTV) would trigger a higher than desired monthly payment. And step 734 includes displaying the maximum loan amount and purchase price for each product type that will qualify, and displaying the results.

FIG. 8A illustrates a layout of a user interface in an embodiment for purchase transactions that include only monthly payments as mandatory input. In the illustrated embodiment, the maximum loan amount is calculated and returned, given only the desired monthly payments. The process is essentially the same as the above described search which uses both monthly payment and down payment information, except that limits on the down payment is now not a constraint. The system calculates and returns the maximum loan amount the consumer can afford given only the desired monthly payment(s). Results returned will reflect the maximum purchase price and corresponding down payment required to make the desired purchase. Essentially, the monthly payment is used as the only search constraint, and the system calculates the required down payment. Optionally, a consumer may designate an estimated purchase price to constrain the down payment calculation. FIG. 8B illustrates a layout of results returned in response to inputs through the interface of FIG. 8A. The figure and the fields shown are for illustrative purposes only, and not to limit the invention to the precise form described. Other modifications and several lender product offerings are possible as would be apparent to one skilled in the art.

Figure 8C:
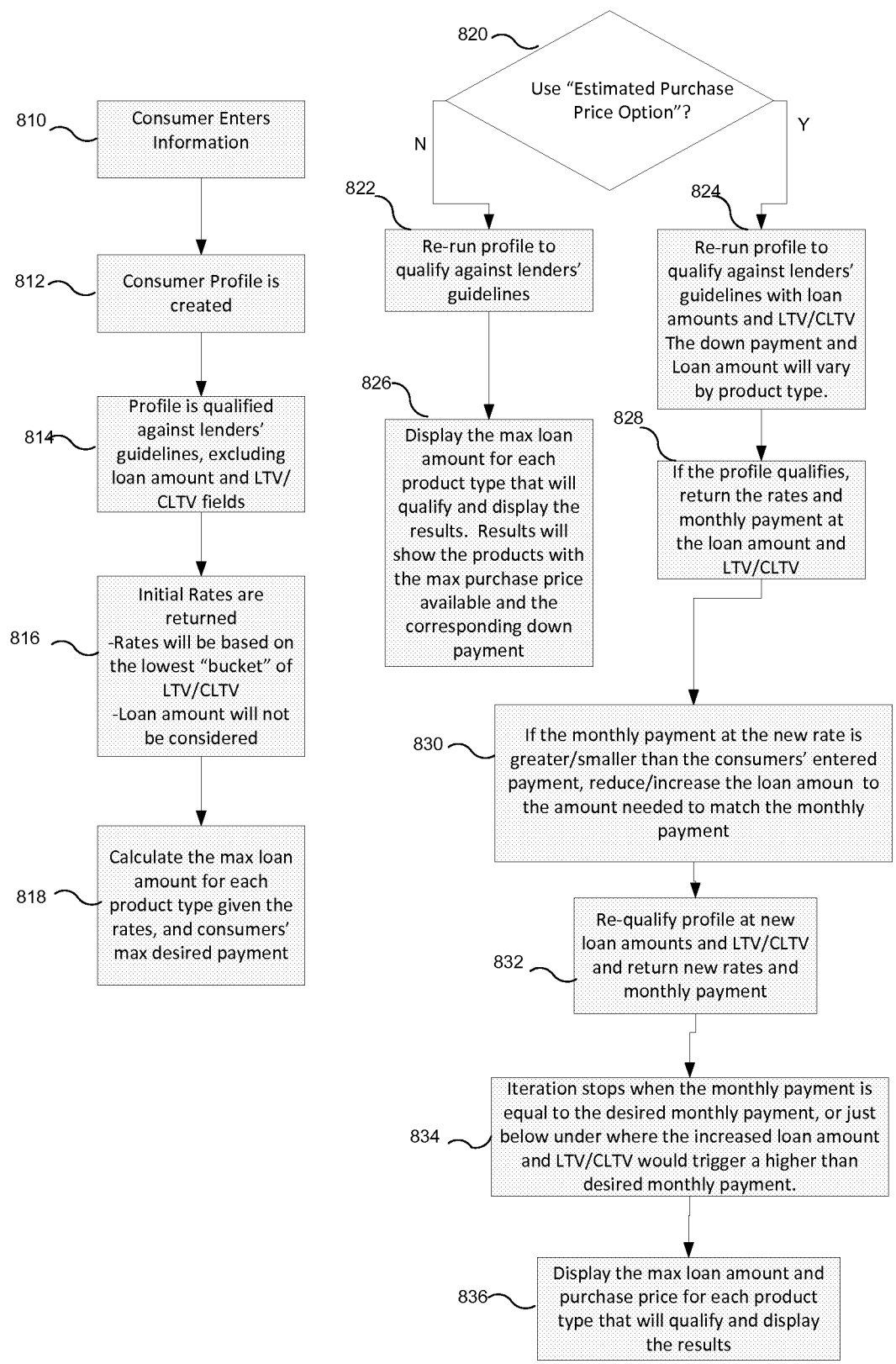
FIG. 8C is an overview of a flow diagram illustrating a step by step process by which purchase transactions are effected using a consumer's desired monthly payment.

FIG. 8C is a process flow diagram illustrating purchase transactions using only the consumer's desired monthly payment. In step 810, a consumer enters his or her information. In step 812, the system creates the consumer profile based on consumer information entered. Step 814 of the illustrated embodiment depicts the consumer profile, wherein the said consumer profile is qualified against lenders' guidelines, excluding loan amount and loan-to-value ratio (LTV) and combined loan-to-value ratio (CLTV) fields. In step 816, the system returns initial rates wherein the rates will be based on the lowest set of loan-to-value ratio (LTV) and combined loan-to-value ratio (CLTV) parameters and the loan amount will not be considered. In step 818, the system performs calculations to find the maximum loan amount for each product type given the rates, and consumers' maximum desired payment. Step 822 follows from step 820, and includes re-running the consumer profile to qualify against lenders' guidelines with loan amounts, excluding the optional Estimated Purchase Price. Step 824 also follows from step 820, but includes the optional Estimated Purchase Price, wherein the consumer profile is re-run to qualify against lenders' guidelines with loan amount and loan-to-value ratio (LTV) and combined loan-to-value ratio (CLTV) from step 818. In step 826 the system checks if the consumer profile qualifies, and if it does, the system returns the rates and monthly payment at the loan amount and loan-to-value ratio (LTV) and combined loan-to-value ratio (CLTV), which includes the max purchase price and corresponding down payment. In step 828 the system checks if the consumer profile qualifies, and if it does, the system returns the rates and monthly payment at the loan amount and loan-to-value ratio (LTV) and combined loan-to-value ratio (CLTV), using the optional Estimated Purchase Price and corresponding down payment. If however, the consumer profile does not qualify, the system lowers the loan amount and loan-to-value ratio (LTV) and combined loan-to-value ratio (CLTV) until the consumer profile qualifies, but keeps the down payment constant. In step 830, if the monthly payment at the new rate is greater or smaller than the consumers' entered payment, the loan amount is reduced or increased (keeping the down payment constant) to the amount needed to match the monthly payment. Step 832 includes re-qualifying the consumer profile at new loan amounts and loan-to-value ratio (LTV) and combined loan-to-value ratio (CLTV) and returning new rates and monthly payment. In step 834, the iteration stops when the monthly payment is equal to the desired monthly payment, or close to but below where the increased loan amount and loan-to-value ratio (LTV) and combined loan-to-value ratio (CLTV) would trigger a higher than desired monthly payment. And step 836 includes displaying the maximum loan amount and required down payment for each product type that will qualify given the Estimated Purchase Price, and displaying the results.

FIG. 9A illustrates a layout of a user interface in an embodiment for purchase transactions that include only desired down payment as mandatory input. In the illustrated embodiment, the maximum loan amount is calculated and returned using only the consumer's desired down payment. In this case the limit on the monthly payment is not a constraint. The system calculates and returns the maximum loan amount and loan-to-value ratio (LTV) and combined loan-to-value ratio (CLTV) that is available, given the available down payment. FIG. 9B illustrates a layout of results returned in response to inputs through the interface of FIG. 9A. FIGS. 9A and 9B are self explanatory, and need not be explained in detail here. The figures and the fields shown are for illustrative purposes only, and not to limit the invention to the precise form described. Other modifications and several lender product offerings are possible as would be apparent to one skilled in the art.

Figure 9C:
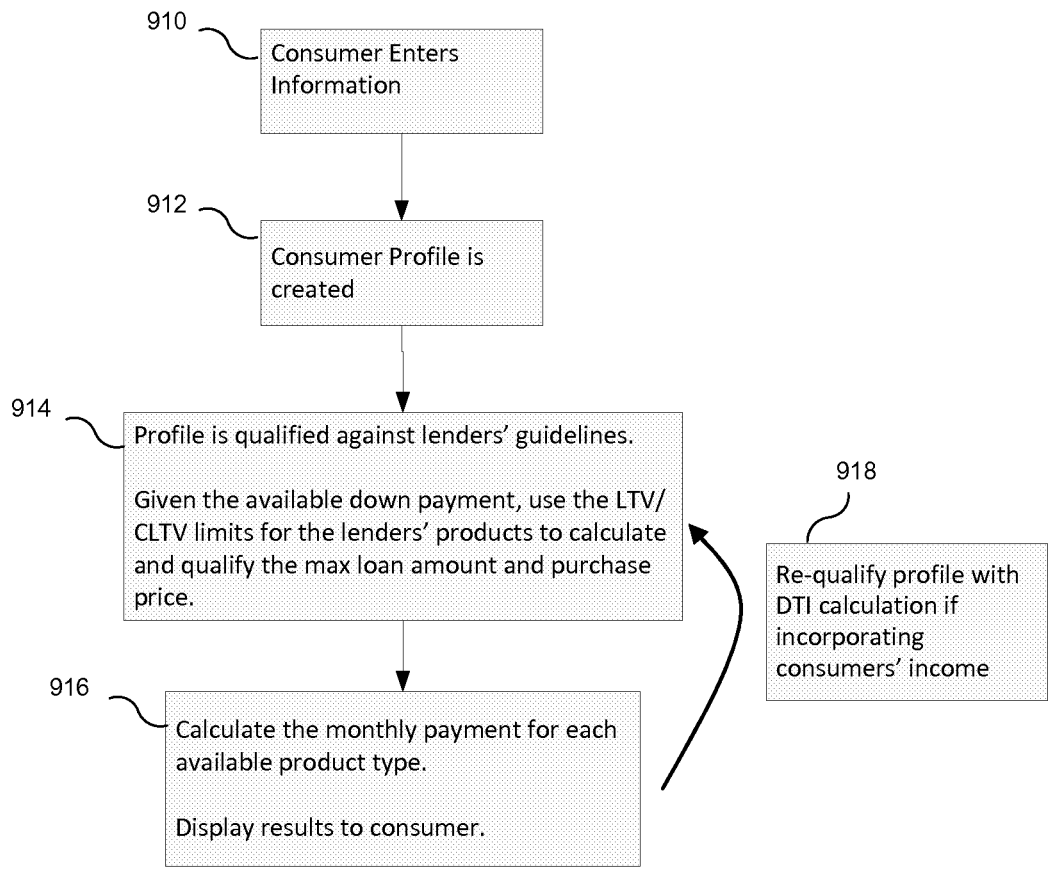
FIG. 9C is an overview of a flow diagram illustrating a step by step process by which purchase transactions are effected using a consumer's desired down payment.

FIG. 9C is a process flow diagram illustrating purchase transactions using only the consumer's desired down payment. In step 910, a consumer enters his or her information. In step 912, the system creates the consumer profile based on consumer information entered. In step 914, the consumer profile is qualified against lenders' guidelines, and given the available down payment, the loan-to-value ratio (LTV) and combined loan-to-value ratio (CLTV) limits are used to calculate and qualify the maximum loan amount and purchase price. In step 916, the monthly payment for each available product type is calculated and results are displayed to the consumer. Additionally, in a preferred embodiment, the consumer profile is re-qualified with Debt-to-Income Ratio (DTI) calculation (918) if consumers' income is also incorporated.

As an example, the maximum loan amount available from an Interest Only 3 year ARM is likely to be higher than the maximum loan amount available from a Fully Amortizing 30 Year Fixed. For each product term and corresponding loan amount, the maximum loan-to-value ratio (LTV) and combined loan-to-value ratio (CLTV) is calculated by dividing the maximum loan amount by the sum of the maximum loan amount and the available down payment: Maximum loan-to-value ratio (LTV) and combined loan-to-value ratio (CLTV)=Maximum Loan Amount/(Maximum Loan Amount+Available Down Payment). At this stage, we have an "ideal" situation in that the monthly payment is likely to be as low as possible because we're using rates from the lowest loan-to-value ratio (LTV) and combined loan-to-value ratio (CLTV).

With the preliminary maximum loan amount and maximum loan-to-value ratio (LTV) and combined loan-to-value ratio (CLTV) now determined, the consumer profile is re-run either manually or automatically by a computer automated system, to find the rates and monthly payment for each product term for each lender using the actual loan amount and loan-to-value ratio (LTV) and combined loan-to-value ratio (CLTV). In the event that the input consumer profile does not qualify with any lender due to Loan Amount and loan-to-value ratio (LTV) and combined loan-to-value ratio (CLTV) limits, the loan amount can be reduced, either manually by the consumer, or automatically by the computer automated system until it qualifies for a product with the given down payment. The goal is to find the maximum loan amount available given the down payment constraints, which is determined by the loan-to-value ratio (LTV) and combined loan-to-value ratio (CLTV) limits.

In a preferred embodiment, if the rate and the corresponding monthly payment are higher than the consumer's desired monthly payment, the loan amount is reduced automatically by an amount needed to achieve the desired monthly payment at the given rate. And if the payment is less than the desired monthly payment, the loan amount is increased by an amount needed to achieve the desired monthly payment at that given rate.

In a preferred embodiment, the consumer profile is re-run to find the actual rate at those loan amounts and loan-to-value ratio (LTV) and combined loan-to-value ratio (CLTV). If the consumer profile does not qualify with increasing the loan amount, the loan amount is lowered, manually or automatically, so that the profile qualifies with the given down payment, even if the monthly payment is lower than that designated by the user.

In preferred embodiments, the method includes iterating, wherein if the payment is greater or less than the desired monthly payment, the loan amount is progressively lowered or raised, either manually or automatically, to iterate and achieve a result that matches the desired monthly payment. The iteration stops when the monthly payment is equal to the desired monthly payment, or just below where the increased loan amount and loan-to-value ratio (LTV) and combined loan-to-value ratio (CLTV) would trigger a higher than desired monthly payment. Essentially, with the above disclosed method, the consumer profile is re-qualified through the guidelines with each new set of loan amounts and loan-to-value ratio (LTV) and combined loan-to-value ratio (CLTV) parameters. Further, in an example embodiment, a consumer profile is qualified only through a top subset of lenders. Another option is to increase or decrease the loan amount sizes according to loan-to-value ratio (LTV) buckets of 5% increments, i.e. 70%, 75%, etc.

Alternatively and additionally, the consumer is provided with the option to enter a range of desired monthly payments. The system is then configured to solve for two monthly payments. A further option to account for additional monthly housing costs can be provided. The additional monthly housing costs include but are not limited to, property taxes, insurance and/or Homeowner's Association dues (HOA dues), anticipated monthly maintenance, and mortgage insurance. Actual figures for the additional monthly housing costs can be estimated as a percentage of the property value, or alternatively, they can be set as fixed amounts when the information is already known, and can be captured either manually or automatically. The payments could be included in the monthly payments as a way for the consumer to consider their total monthly housing payment. Additionally, the payments are also added to the "monthly debt payments" as a way to qualify the borrower based on the Debt-to-Income ratios.

Additionally, in an embodiment, an option would be provided to the consumer to pay additional "points" upfront to reduce the interest rate. The "points" can be entered as a percentage of the loan amount. Subsequently, the rates returned would include a calculation that would reduce the interest rate by the "points" designated by the borrower/consumer. Alternatively, if/when the consumer does not specify the points he/she is willing to pay, the loan products calculated that match the consumer's desired monthly payments are displayed alongside the points required to get the consumer's desired rate and monthly payment. Further, if the consumer does not want to pay closing costs, the closing costs are estimated and the Yield Spread (also known as the Service Release Premium, Gain on Sale, or Rebate) is calculated along with the corresponding interest rate in an amount large enough to cover the closing costs, or a part thereof. The Yield Spread is calculated as a percentage of the loan amount.

FIG. 10A illustrates a layout of a user interface in an embodiment for refinance transactions. The embodiment illustrated includes a method and system to search for and execute refinance transactions. Preferably, when a consumer/borrower inputs their profile, the method includes getting rates from all loan product types that qualify. If the monthly payment for a particular term is less than the desired monthly payment, iteration stops and the result is returned to the consumer. On the other hand, if the monthly payment is greater than the desired monthly payment, the rate for the term that will get the monthly payment down to the required desired level is found, and the points required to be paid to get the said monthly payment down is calculated. Further, if the consumer enters Funds Available for Closing Costs that are lower than the estimated closing costs, the system finds the rate that pays the corresponding Yield Spread to cover those costs. However, if that corresponding rate results in a higher monthly payment than desired, no result may be shown. FIG. 10B illustrates a layout of results returned in response to inputs through the interface of FIG. 10A. It would be appreciated that the aforedescribed illustration is of one possible embodiment, and is not a definition of the limits of the invention.

Figure 10C:
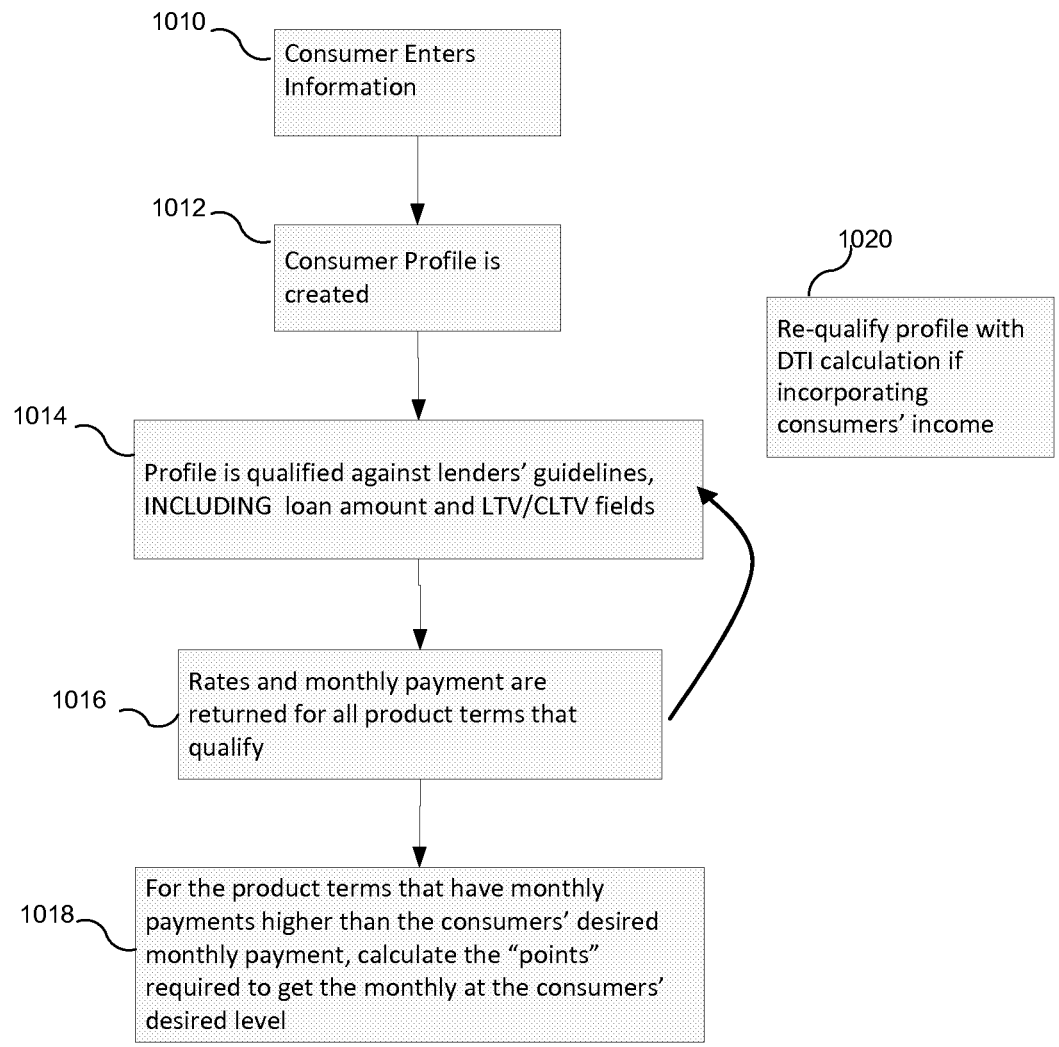
FIG. 10C is an overview of a flow diagram illustrating a step by step process by which refinance transactions are effected.

FIG. 10C is a process flow diagram illustrating refinance transactions. In step 1010, the consumer enters his or her information, in step 1012 the system creates a consumer profile, in step 1014 the consumer profile is qualified against lenders' guidelines including loan amount and loan-to-value ratio (LTV) and combined loan-to-value ratio (CLTV) fields, in step 1016 the system returns rates and monthly payment amounts for all product terms that qualify, and in step 1018 the system calculates points to get the monthly payment to the consumer's desired level for product terms that have monthly payments higher than the consumer's desired monthly payment. Additionally, if the consumer's income is incorporated in the consumer profile and factored in the calculations, the consumer profile is re-qualified (step 1020) with the DTI calculation.

FIG. 11A illustrates a layout of a user interface in an embodiment for cash-out transactions. The method includes getting rates from all product terms that qualify. Additionally, if the monthly payment for a particular term is less than the desired monthly payment, the system stops iterating and returns the result to the consumer. However, if the monthly payment calculated is greater than the consumer's desired monthly payment, the system searches for a rate for the term that will get the monthly payment down, and calculates the points required to be paid to get the said monthly payment down. If additional points are required to get the monthly payments down, the consumer profile needs to be re-run through the system, to re-qualify. Note also that cash-out amount does not have to be too high to consider closing costs separately. Further, including the closing costs in the Cash-Out amount is optional, and need not happen automatically. FIG. 11B illustrates a layout of results returned in response to inputs through the interface of FIG. 11A.

Figure 11C:
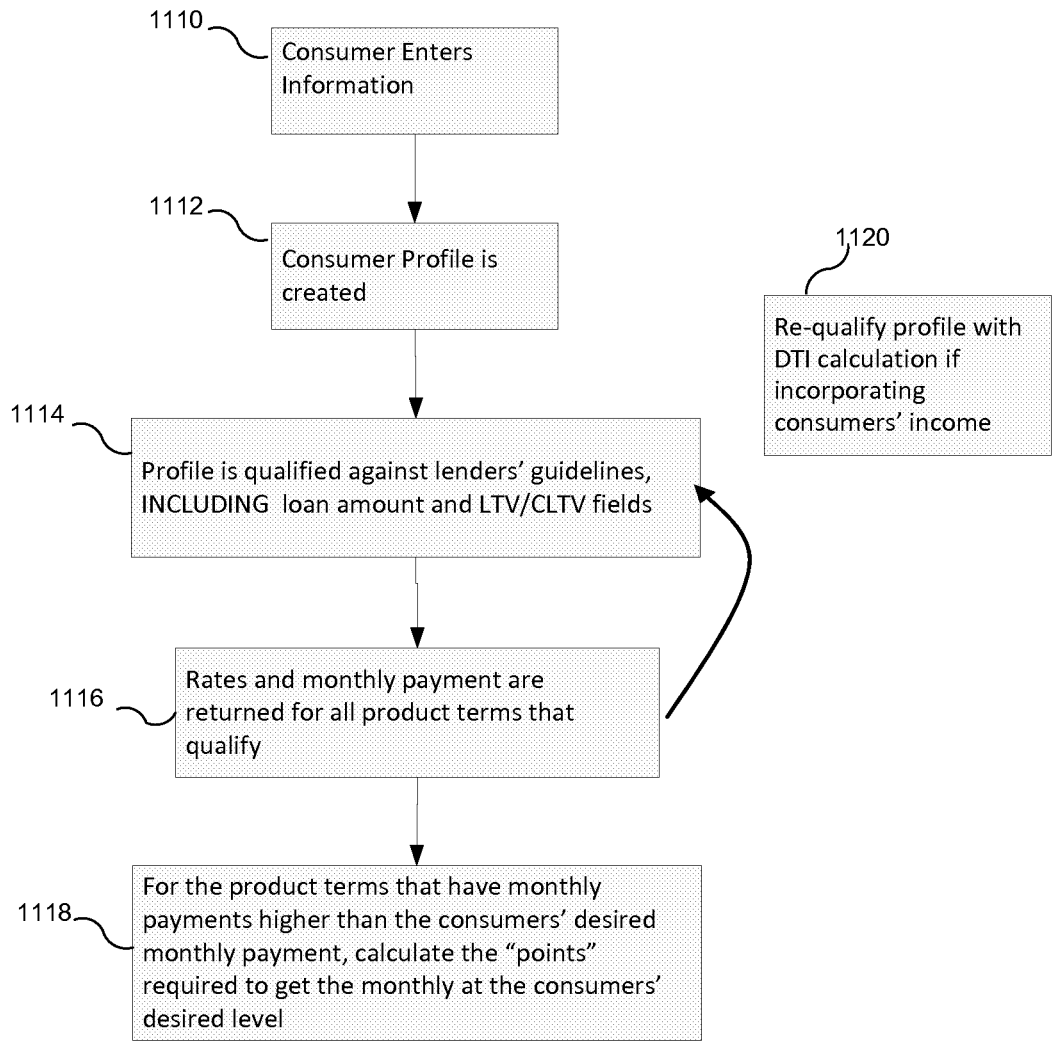
FIG. 11C is an overview of a flow diagram illustrating a step by step process by which cash-out transactions are effected.

FIG. 11C is a process flow diagram illustrating cash-out transactions. In step 1110, the consumer enters his or her information, in step 1112 the system creates a consumer profile, in step 1114 the consumer profile is qualified against lenders' guidelines including loan amount and loan-to-value ratio (LTV) and combined loan-to-value ratio (CLTV) fields, in step 1116 the system returns rates and monthly payment amounts for all product terms that qualify, and in step 1118 the system calculates points to get the monthly payment to the consumer's desired level for product terms that have monthly payments higher than the consumer's desired monthly payment. Optionally, if the consumer does not want to pay closing costs, the closing costs can be estimated and some or all of the costs can be included in the cash-out amount, or the Yield Spread is calculated along with the corresponding interest rate in an amount large enough to cover the closing costs, or a part thereof. The Yield Spread is calculated as a percentage of the loan amount. Additionally, if the consumer's income is incorporated in the consumer profile and factored in the calculations, the consumer profile is re-qualified (step 1120) with the Debt-to-Income ratio (DTI) calculation.

Embodiments disclosed can also include determining a maximum loan amount available to a consumer based on the input consumer profile and minimum compliance level of data wherein the said minimum compliance level of data comprises loan characteristics, qualifying ratios and limits, base rate pricing, yield spread rate pricing and pricing adjustments, and rate add-ons. The input for the consumer profile and minimum compliance level of data can include, but is not limited to, annual income, monthly debt payments, credit score, property type, occupancy type, and state.

In the embodiments disclosed, the maximum loan amount may be split into two loans. While, the starting point may be arbitrary, if the loan-to-value ratio (LTV) and combined loan-to-value ratio (CLTV) is greater than or equal to 80%, the first mortgage loan amount could be set to an 80% loan-to-value ratio (LTV) and the second mortgage is set to the remaining balance. Alternatively, the first mortgage could be set to a conforming loan amount, and the second mortgage for the remainder. The method further includes determining the rate and monthly payments for the first and second mortgages at the loan amounts and loan-to-value ratio (LTV) and combined loan-to-value ratio (CLTV).

Preferably, available loans are selected based on a comparison of the consumer profile to the minimum compliance level of data. Additional optional qualification components of the loan broker lender database further contribute to enhanced accuracy. While the programming logic may determine that a singular loan product best meets the consumer's needs as detailed in the consumer profile, a useful and innovative component of preferred embodiments enables the data processor to combine a plurality of available loan products to create and offer a combination of loans that may best meet the consumer's needs by providing a combined loan with the overall lowest monthly payments or lowest blended par rate. This best available loan product may be a combination of loan products that are offered by the same or a plurality of lending institutions. A "combo-loan" product with an 80/20% ratio of two loans is described below. Other variants are possible wherein, for example, the consumer may otherwise obtain optimal loan product pricing with combinations of loans combined in for example a 75/25% ratio, a 90/10% ratio, or even for a 40/15/5% ratio of three individual loan products, combined to satisfy a consumer's need for a 60% loan-to-value ratio (LTV) loan.

In the present example with an assumed loan-to-value ratio (LTV) greater than 80%, the data processor creates one or more additional temporary "dummy" consumer profiles that allow for qualification of multiple loan products for the creation of a combined best available loan product solution. For example, the desired loan amount could be divided into a first mortgage equal to exactly 80% of loan-to-value ratio (LTV) and a second mortgage with the remaining loan-to-value ratio (LTV). If the desired loan-to-value ratio (LTV) is 80% or less, the program logic could proceed with only the first mortgage equal to that loan-to-value ratio (LTV) as originally entered, or it could determine that a combination of mortgages could still provide the best solution for matching the consumer's qualifications and needs to the best available loan products with associated rate pricing.

The data processor accomplishes this by searching the loan broker lender database to obtain and match all rates, yield spread pricing adjustments, and rate add-ons for the consumer profile, and by first calculating loan amounts based on the desired down payment or/and desired monthly payment. The program logic does not calculate monthly payments for loan products that do not match the consumer profile regarding the following fields: use of proceeds, property type, occupancy type, property location, documentation type, and loan terms. The calculation of monthly payments does not include rate add-ons based on the fields that are dependent on monthly payment amounts, for example front DTI, back DTI, PITI reserves, and disposable income.

In alternate embodiments the programming logic may execute alternative steps in differing order; however, in the present example the data processor next optimizes loan product pricing by calculating minimal loan amounts based on desired monthly payments or/and desired down payments for all loan products that satisfy the requirements of the consumer profile. If "combo" loans are a subset of all loan products available, then minimal loan amounts are calculated for traditional loan products followed by calculations for the available combo loans.

For each available loan product, the data processor calculates the criteria in the consumer profile that are dependent on the value of the monthly payment, namely: front DTI, back DTI, PITI reserves, and disposable income. Based on these calculations, yield spread pricing adjustments, and rate add-ons are determined accordingly. Monthly payments are recalculated and the data processor repeats the steps iteratively to conclusion of loan product pricing optimization.

Conforming combination loans can also be offered wherein an automatic search is performed for the best rate with the combination loan. As an example, say a one million dollar loan is required to finance a one million dollar property. The search would look for a single loan at one million dollars, and return the result. Then the first mortgage is set to $800,000 and the second mortgage is set to $200,000. Essentially, the system is configured to automatically optimize amounts. So for example, if mortgage insurance needs to be paid for a mortgage amount higher than 80% of the value of the property in question, the combination loan is split into two amounts such that neither of the split amounts is higher than 80%. Additionally and alternatively, the system can be configured to return multiple results for multiple loan types. In one embodiment the system returns two results, one for a single loan and the other for a combination loan. Other alternatives are possible, as would be apparent to one skilled in the art.

In yet another alternative embodiment, a second combination loan is returned in an automatic search for the optimal payment. As an example, say the above mentioned million dollar property is selected, but a loan amount of only $500,000 is required. In a preferred embodiment, the search would return a single loan at $500,000 and a combination loan with a first mortgage at $417,000 (the current Conforming limit for a single family residence) and a second mortgage amount of $83,000 on a single family property. Preferably the system is configured based on market rates and conditions. So the amounts returned in the combination loan are because the consumer would get a lower rate with a conforming first and second loan, since presently the market is more liquid for conforming loans than for larger, non-Conforming loan amounts.

The loan broker server(s) also have the ability to communicate with credit bureau or alternative data servers or devices, for example, other institutions that deal with conforming loans—that is, loans that meet the criteria for maximum loan amounts and other standards set forth by Fannie Mae and Freddie Mac for example. Consumers may access the automated underwriting systems of such institutions or obtain access to the updated and stored information via the loan broker lender database. For example, the data processor may compare a consumer profile to the qualification standards of Desktop Underwriter or Loan Prospector, the automated underwriting systems of Fannie Mae and Freddie Mac, respectively, to determine if the consumer qualifies for a conforming loan product. If so, the data processor may also obtain typically lower associated conforming loan rate pricing.

Preferred embodiments factor in two central elements in the iteration with combination loans. The objective essentially is to maximize the total loan amount even while optimizing multiple loan amounts to get at or below the desired monthly payment. To do this, the system can be configured to automatically gradually increase or decrease the loan amount on the first and/or second mortgage. The total loan amount can thus be expanded if adjusting the respective loan amounts lowers the monthly payment.

Combination loans and conforming combination loans, and their methods thereof are explained in further detail in patent application Ser. No. 11/390,805, entitled "Customized Consumer Loan Search and Optimized Loan Pricing" which is incorporated by reference in its entirety.

An embodiment includes a method of interfacing a customer computer or device to an additional computer or device through a network interface for searching a first database of a plurality of available product or property sets and a second database of lending institutions' underwriting and pricing guidelines for a consumer. The method comprises the steps of receiving and storing consumer information within the additional computer or device, performing one or more calculations using the consumer information to obtain credit related values, creating a consumer profile comprising consumer information and the results of credit related value calculations, and based on the created consumer profile matched with lending institutions, identifying and presenting a consumer a product or property set or a plurality of purchasable product or property sets.

In a preferred embodiment, consumer information comprises desired down payment and desired monthly payment information. Additionally and alternatively, consumer information comprises loan and property information, income information, and credit information. The said loan and property information further comprises property value, cash-out amount, property location, property type, terms, length of loan, interest only loan or otherwise, total number of properties owned, acreage, or square footage. The said income information further comprises type of income documentation, income, expenses, value of liquid assets, property taxes, insurance cost, or employment information. And the said credit information further comprises credit score or scores, credit self-ranking, payment history, bankruptcy history, consumer credit counseling history, or/and foreclosure or notice of default history.

Figure 6:
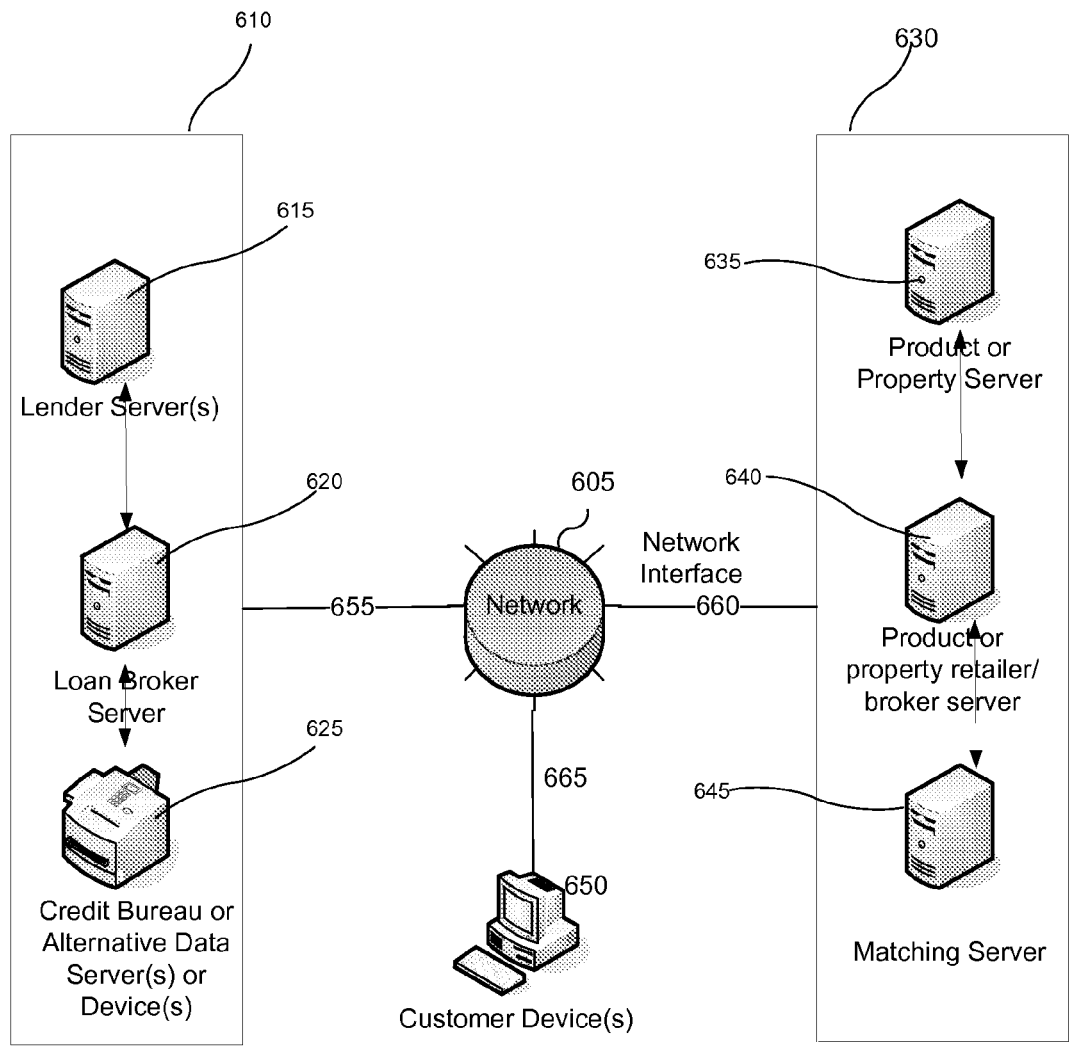
FIG. 6 illustrates an alternate embodiment for implementing the method and system of the present invention

FIG. 6 illustrates an alternate embodiment for implementing the method and system of the present invention. The illustrated embodiment includes a method and system for implementing a product or property search for a consumer, based upon a consumer's desired down payment or desired monthly payment, comprising, receiving by a first subsystem 610 a consumer profile input from a user interface 650 and qualifying the input consumer profile against a single or plurality of lender's guidelines in the first subsystem 610, and matching by a second subsystem 630, lenders with whom the consumer qualifies, with product sets or properties, and presenting the consumer with a set of available products or properties to select. Preferably, the user inputs his or her information through interface 650 of user device, which device communicates over the network 605 with the first subsystem 610 through network interfaces 655 and 665. The first subsystem further comprises lender server or servers 615, loan broker server 620, and credit bureau or alternative data servers 625, all of which communicate with each other, as and when required. The subsystem 610 further also communicates over the network through network interface 655 and 660 with subsystem 630. Subsystem 630 further comprises product or property server 635, product or property retailer/broker server 640, and matching server 645. Matching server 645 further serves to match a qualified lender with a product or property set based on a consumer profile, and sends the processed results to the consumer over network interfaces 655 and 665. In a preferred embodiment, the method includes calculating in the first sub-system, a maximum loan amount for a consumer, given the interest rate and the consumer's maximum desired payment, the maximum purchase price and loan-to-value ratio (LTV) and combined loan-to-value ratio (CLTV), re-running the consumer profile against lenders' guideline criteria, and displaying to the consumer, the maximum loan amount and purchase price for each product or property type that will qualify. Additionally, if the consumer profile does not qualify against lenders' guideline criteria, the input loan amount and loan-to-value ratio (LTV) and combined loan-to-value ratio (CLTV) is lowered, and the consumer profile is re-run against lenders' guideline criteria, keeping the down payment constant. A preferred embodiment further includes returning by the subsystem to the consumer, acceptable interest rates and monthly payment at the loan amount and loan-to-value ratio (LTV) and combined loan-to-value ratio (CLTV) if the consumer profile qualifies against lender guideline criteria. And if the returned monthly payment at the acceptable interest rate is greater or smaller than the consumers' entered payment, the first subsystem facilitates re-entering a lesser or greater loan amount as the case may be, and re-runs the entered consumer profile with the new amounts, to re-qualify the consumer with new loan amounts and loan-to-value ratio (LTV) and combined loan-to-value ratio (CLTV) to return a new rate and monthly payment. In one embodiment, the method further includes splitting the maximum loan amount into two loans wherein the first loan amount is a conforming loan amount and the second loan amount is for the remainder of the loan amount.

An embodiment includes a system to implement a product or property search for a consumer, based upon a consumer's desired down payment or desired monthly payment comprising a first subsystem adapted to receive a consumer profile input from a user interface wherein the said subsystem is capable of qualifying the input consumer profile against a single or plurality of lenders' guidelines, and a second subsystem adapted to match lenders' with whom the consumer qualifies with product sets or properties, and to present the consumer with a set of available products or properties to select. In a preferred embodiment, the first subsystem is further adapted to calculate a maximum loan amount for a consumer, given the interest rate and the consumer's maximum desired payment, calculate the maximum purchase price and loan-to-value ratio (LTV) and combined loan-to-value ratio (CLTV), re-run the consumer profile against lenders' guideline criteria, and display to the consumer, the maximum loan amount and purchase price for each product or property type that will qualify. Additionally, the sub-system is further adapted wherein if the consumer profile does not qualify against the lenders' guideline criteria, the input loan amount and loan-to-value ratio (LTV) and combined loan-to-value ratio (CLTV) is lowered and the consumer profile is re-run against lenders' guideline criteria keeping the down payment constant. And if the consumer profile qualifies against lender guideline criteria, the subsystem returns to the consumer acceptable interest rates and monthly payment at the loan amount and loan-to-value ratio (LTV) and combined loan-to-value ratio (CLTV). In preferred embodiments, if the returned monthly payment at the acceptable interest rate is greater or smaller than the consumers' entered payment, the first subsystem facilitates re-entering a lesser or greater loan amount as the case may be, and re-runs the entered consumer profile with the new amounts, to re-qualify the consumer with new loan amounts and loan-to-value ratio (LTV) and combined loan-to-value ratio (CLTV) to return a new rate and monthly payment. Preferably, the subsystem is further adapted to split the maximum loan amount into two loans wherein the first loan amount is a conforming loan amount and the second loan amount is for the remainder of the loan amount.

Foregoing described embodiments of the invention are provided as illustrations and descriptions. They are not intended to limit the invention to the precise form described. Other variations and embodiments are possible in light of above teachings, and it is thus intended that the scope of invention not be limited by this Detailed Description, but rather by the following claims.

We claim:

1. A method for implementing a property and loan search for a consumer, the method comprising the steps of:
    searching by a computer or device via a network interface, a first database of a plurality of available property sets and a second database of lending institutions' guideline or qualification criteria and interest rate pricing for the consumer;
    receiving and storing, via the network interface, consumer information, within an additional computer or device, wherein the consumer information comprises a desired down payment and a desired monthly payment input by the consumer;
    performing by the additional computer or device, one or more calculations using the consumer information to obtain credit related values, wherein the one or more calculations further comprise:
        calculating a maximum loan amount for the consumer, given an interest rate and the consumer's maximum desired payment;
        calculating a maximum purchase price and loan-to-value ratio (LTV) or combined loan-to-value ratio (CLTV); and
        calculating and displaying to the consumer, the maximum loan amount and purchase price for each property that qualifies;
    creating by the additional computer or device, the consumer profile comprising the received consumer information and results of credit related value calculations; and
    based on the created consumer profile matched with lending institutions, identifying from the first database, a plurality of purchasable properties and presenting the identified purchasable properties to the consumer via the network interface;
    selecting a purchasable property by the consumer; and
    optimizing an available loan with the selected, purchasable property for the consumer, wherein the optimizing the available loan with the selected, purchasable property further comprises automatically changing the created consumer profile to obtain a preferred loan term, and at least one of a lower interest rate, a lower down payment, and lowered monthly payment on the selected property; and
    wherein the optimizing further comprises:
        if the preferred loan term is not obtained, splitting the loan amount into a plurality of loans to obtain a plurality of loan products;
        combining the plurality of loan products, and presenting the combined loan products to the consumer such that the plurality of loan products cumulatively equal the maximum loan amount, and such that at least one loan amount is a conforming loan amount.

2. The method of claim 1, wherein receiving and storing consumer information comprises receiving loan and property information, income information, and credit information.

3. The method of claim 2, wherein receiving loan and property information comprises receiving property value, cash-out amount, property location, property type, terms, length of loan, interest only loan or otherwise, total number of properties owned, acreage, or square footage.

4. The method of claim 2, wherein receiving income information comprises receiving type of income documentation, income, expenses, value of liquid assets, property taxes, insurance cost, or employment information.

5. The method of claim 2, wherein receiving credit information comprises receiving credit score or scores, credit self-ranking, payment history, bankruptcy history, consumer credit counseling history, or foreclosure or notice of default history.

6. In a computer system comprising a processing unit coupled to a memory element, a method for implementing a property and loan search for a consumer, comprising:
    receiving the consumer profile input from a user interface, and qualifying the input consumer profile against guideline or qualification criteria of a single or plurality of lender's wherein the input consumer profile comprises a desired down payment and a desired monthly payment input by the consumer; and
    matching lenders with whom the consumer qualifies, with a plurality of purchasable properties, and presenting the consumer with the plurality of purchasable properties to select;

calculating a maximum loan amount for the consumer, given an interest rate and the consumer's maximum desired payment;

calculating a maximum purchase price and loan-to-value ratio (LTV) or combined loan-to-value ratio (CLTV); and calculating and displaying to the consumer, the maximum loan amount and purchase price for each property that qualifies; and based on a property selected by the consumer, optimizing an available loan with the selected property wherein the optimizing further comprises changing the consumer profile to obtain a preferred loan term, and at least one of a lower interest rate, a lower down payment, and a lowered loan amount on the selected property; and wherein the optimizing further comprises:

if the preferred loan term is not obtained, splitting the loan amount into a plurality of loans to obtain a plurality of loan products;

combining the plurality of loan products, and presenting the combined loan products to the consumer such that the plurality of loan products cumulatively equal the maximum loan amount, and such that at least one loan amount is a conforming loan amount.

7. The method of claim 6 further comprising lowering the input loan amount and loan-to-value ratio (LTV) or combined loan-to-value ratio (CLTV), and re-running the consumer profile against lenders' guideline criteria keeping the down payment constant, if the consumer profile does not qualify against lenders' guideline criteria.

8. The method of claim 6 further comprising returning by the computer system, to the consumer, interest rates and monthly payment at the loan amount and loan-to-value ratio (LTV) or combined loan-to-value ratio (CLTV) if the consumer profile qualifies against lender guideline criteria.

9. The method of claim 8 wherein if the returned monthly payment at the interest rate is greater or smaller than the consumers' entered payment, the computer system facilitates re-entering a lesser or greater loan amount as the case may be, entering a down payment amount which will result in a qualified applicant's desired monthly payment calculation for the new loan amount, and re-runs the entered consumer profile with the new amounts, to re-qualify the consumer with new loan amounts and loan-to-value ratio (LTV).

10. The method of claim 6 wherein the splitting comprises splitting the maximum loan amount into two loans wherein the first loan amount is a conforming loan amount and the second loan amount is for the remainder of the loan amount.

11. The method of claim 6 wherein the said splitting further comprises splitting the maximum loan amount into two loans wherein the first mortgage is set to the conforming loan amount, and the second mortgage for the remainder.

12. The method of claim 11 further comprising determining the rate and monthly payments for the first and second mortgages at the loan amounts and loan-to-value ratio (LTV) or combined loan-to-value ratio (CLTV).

13. A computer automated system to implement a property and loan search for a consumer, wherein the computer automated system comprises a processing unit coupled to a memory element having instructions encoded thereon, which instructions cause the system to:

receive a consumer profile input from a user interface, and qualify the input consumer profile against a single or plurality of lenders' guideline or qualification criteria wherein the input consumer profile comprises a desired down payment and a desired monthly payment input by the consumer; and match lenders' with whom the consumer qualifies with a plurality of purchasable properties, and present the consumer with available purchasable properties to select along with associated, matched lenders;

calculate a maximum loan amount for the consumer, given an interest rate and the consumer's maximum desired payment;

calculate a maximum purchase price and loan-to-value ratio (LTV) or combined loan-to-value ratio (CLTV); and calculate and display to the consumer, the maximum loan amount and purchase price for each property that qualifies; and based on a property selected by the consumer, optimize loans with the matched property for the consumer wherein the optimizing loans with the matched property further comprises changing the consumer profile to obtain a preferred loan term and at least one of a lower interest rate, a lower down payment, and an increased loan amount on the selected property; and wherein the optimizing further comprises:

if the preferred loan term is not obtained, splitting the loan amount into a plurality of loans to obtain a plurality of loan products;

combining the plurality of loan products, and presenting the combined loan products to the consumer such that the plurality of loan products cumulatively equal the maximum loan amount, and such that at least one loan amount is a conforming loan amount.

14. The system of claim 13 wherein if the consumer profile does not qualify against the lenders' guideline criteria, the input loan amount and loan-to-value ratio (LTV) or combined loan-to-value ratio (CLTV) is lowered and the consumer profile is re-run against lenders' guideline criteria keeping the down payment constant.

15. The system of claim 13 wherein if the consumer profile qualifies against lender guideline criteria, the system returns to the consumer interest rates and monthly payment at the loan amount and loan-to-value ratio (LTV) or combined loan-to-value ratio (CLTV).

16. The system of claim 13 wherein if the returned monthly payment at the interest rate is greater or smaller than the consumers' entered payment, the system facilitates re-entering a lesser or greater loan amount as the case may be, entering a down payment amount which will result in a qualified applicant's desired monthly payment calculation for the new loan amount, and re-runs the entered consumer profile with the new amounts, to re-qualify the consumer with new loan amounts and loan-to-value ratio (LTV).

17. The system of claim 13 wherein the said splitting further comprises splitting the maximum loan amount into two loans wherein the first loan amount is the said conforming loan amount and the second loan amount is for the remainder of the loan amount.

18. The system of claim 13 wherein splitting the loan amount further causes the system to split the maximum loan amount into two loans wherein the first mortgage is set to a conforming loan amount, and the second mortgage for the remainder.

19. The system of claim 18 wherein the system is further adapted to determine the rate and monthly payments for the first and second mortgages at the loan amounts and loan-to-value ratio (LTV) or combined loan-to-value ratio (CLTV).

* * * * *